(12) United States Patent
Shinmura et al.

(10) Patent No.: US 6,295,496 B1
(45) Date of Patent: Sep. 25, 2001

(54) CO-OPERATIVE CONTROL SYSTEM FOR A VEHICLE

(75) Inventors: Tomoyuki Shinmura; Hiromi Inagaki; Masakatsu Hori; Tatsuhiro Tomari; Shinji Okuma; Akihiro Iwazaki; Takashi Kuribayashi; Kazuhiro Wada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,272

(22) Filed: Sep. 1, 2000

(30) Foreign Application Priority Data

Sep. 7, 1999 (JP) .................................................. 11-253035

(51) Int. Cl.[7] ...................................................... G06F 15/20
(52) U.S. Cl. ................................ 701/48; 701/69; 701/41; 180/446
(58) Field of Search ................................ 701/36, 41, 48, 701/69; 180/443, 446

(56) References Cited

U.S. PATENT DOCUMENTS 5,189,617 * 2/1993 Shiraishi ................................ 701/48
5,369,581 * 11/1994 Ohsuga et al. ........................ 701/111

FOREIGN PATENT DOCUMENTS 11129927 5/1999 (JP) .

* cited by examiner

Primary Examiner—William A. Cuchlinski, Jr.
Assistant Examiner—Marthe Y. Marc-Coleman
(74) Attorney, Agent, or Firm—Carrier, Blackman & Associates, P.C.; Joseph P. Carrier; William D. Blackman

(57) ABSTRACT

A co-operative control system for a vehicle having a force distribution device for distributing at least one of a driving force and a braking force between spaced apart wheels, the co-operative system having: a first control mechanism for controlling the operation of the force distribution device, an electric power steering device having a motor for applying a steering assist torque to a steering system of the vehicle, and a second control mechanism for calculating a motor control signal for driving the motor based on at least a steering torque detected by a steering torque sensor, and for inhibiting drive of the motor based on at least an actual motor detected by a current sensor and the steering torque. The first control mechanism calculates a correction signal for correcting the motor control signal based on the amount of control of the force distribution device and an offset current for correcting the actual motor current signal; and the second control mechanism drives the motor based on a corrected motor control signal obtained by correcting the motor control signal with the correction signal and inhibits the drive of the motor based on a value obtained by correcting the actual motor current signal with the offset current and the steering torque signal, the offset current being set smaller than the correction signal.

2 Claims, 13 Drawing Sheets

CO-OPERATIVE CONTROL SYSTEM FOR A VEHICLE

BACKGROUND OF THE INVENTION

1. Field of the Invention

The present invention relates to co-operative control systems for vehicles comprising a combination of a driving force or braking force distribution device which distributes the driving force or braking force between the right and left wheels or between the front and rear wheels and an electric power steering device which applies a steering assist torque to a steering system.

2. Description of the Relevant Art

There is a known technique for enhancing turning performance of a vehicle where the ratio by which the engine driving force is distributed between the right and left driven wheels is made variable, and the driving force distributed to the outer turning wheel is increased while the driving force distributed to the inner turning wheel is decreased so as to generate a yaw moment in the turning direction. In a vehicle having such a driving force distribution device, there is a disadvantage that when the driving forces distributed to the right and left driven wheels are varied, an undesirable steering force is produced in the right and left driven wheels which also serve as steered wheels (the torque steer phenomenon). Therefore, the present assignee has already made a proposal in which the torque steer phenomenon is lessened by utilizing an electric power steering device, which is provided in a vehicle and generates a steering assist torque in the electric power steering device so as to counteract the above-mentioned undesirable steering force (ref. Japanese Patent Application No. 9-302155).

Also, the present assignee has already made a proposal in which, with regard to a vehicle having an electric power steering device and in order to prevent an undesirable steering assist torque from being generated by an abnormality in the control means for the electric power steering device, when the actual motor current running in the motor of the electric power steering device and the steering torque detected by the steering torque detecting means are in a predetermined assist inhibition area, the drive of the motor of the electric power steering device is inhibited (ref. Japanese Patent Application No. 10-370099).

In the case where the vehicle has both of the previously proposed driving force distribution device and electric power steering device, the actual motor current of the electric power steering device includes a current component for assisting the steering operation of the driver and a current component for lessening the torque steer phenomenon. Therefore, if the value for the aforementioned assist inhibition area is looked up on the basis of the actual motor current, there is a possibility that, under the influence of the current component for lessening the torque steer phenomenon, the operation of the electric power steering device could be inhibited when its operation is necessary or the operation of the electric power steering device could be permitted when its operation is unnecessary.

The present assignee has, however, already made another proposal in which, with regard to a vehicle carrying out co-operative control of a driving force distribution device and an electric power steering device, the torque steer phenomenon can be effectively reduced by changing the aforementioned assist inhibition area according to the value of the current component for lessening the torque steer phenomenon so as to make the electric power steering device generate a steering torque in the opposite direction to that for assisting the steering operation (ref. Japanese Patent Application No. 11-63114).

When a vehicle carrying out co-operative control of a driving force distribution device and an electric power steering device travels in a straight line, both the current component for assisting the steering operation and the current component for lessening the torque steer phenomenon become zero. However, in the case where a current component for lessening the torque steer phenomenon is output due to a malfunction of the control means when the vehicle is travelling in a straight line and the torque steer phenomenon is not occurring, since the above-mentioned proposal described in Japanese Patent Application No. 11-63114 does not inhibit the output of the current component for lessening the torque steer phenomenon by using an assist inhibition area, an unexpected steering assist torque is produced and there is a possibility that the driver might experience a disagreeable sensation.

SUMMARY OF THE INVENTION

The present invention has been carried out in view of the above-mentioned circumstances, and it is an objective of the present invention to prevent the electric power steering device from generating a steering assist torque which gives a disagreeable sensation to the driver when the control means malfunctions in a co-operative control system for a vehicle which reduces the torque steer phenomenon by co-operatively controlling a driving force or braking force distribution device and an electric power steering device.

In order to achieve such objective, in accordance with a first characteristic of the present invention, a co-operative control system for a vehicle is proposed, with regard to a vehicle comprising force distribution device for distributing the driving force or braking force between spaced apart wheels, the vehicle co-operative control system comprising: a first control means for controlling the operation of the force distribution device; an electric power steering device having a motor for applying a steering assist torque to the vehicle steering system; and a second control means for calculating a motor control signal for driving the motor based on at least a steering torque signal detected by a steering torque detecting means and for inhibiting drive of the motor based on at least an actual motor current signal detected by a current detecting means and the steering torque signal; wherein the first control means calculates a correction signal for correcting the motor control signal based on an amount of control of the force distribution device and an offset current for correcting the actual motor current signal, and the second control means drives the motor based on a corrected motor control signal obtained by correcting the motor control signal with the correction signal and inhibits the drive of the motor based on a value obtained by correcting the actual motor current signal with the offset current and the steering torque signal, the offset current being set so as to be smaller than the correction signal.

In accordance with such co-operative control system for a vehicle, since a corrected motor control signal is calculated by correcting a motor control signal calculated by the second control means of the electric power steering device with a correction signal calculated by the first control means based on the amount of control of the force distribution device, and the second control means drives the motor of the electric power steering device based on the corrected motor control signal, it is possible to simultaneously assist the steering operation of the driver and lessen the torque steer phenomenon. Moreover, since the offset current for correcting the actual motor current signal is set so as to be smaller than the correction signal, when it is determined that the drive of the motor should be inhibited, if the first control means malfunctions so outputting an inadequate correction signal, it is possible to effectively inhibit the drive of the motor and prevent the electric power steering device from generating a steering assist torque which would give the driver a disagreeable sensation.

In accordance with a second characteristic of the present invention, in addition to the first characteristic described above, a co-operative control system for a vehicle is proposed, with regard to a vehicle having a force distribution device for distributing the driving force or braking force between spaced apart wheels, the co-operative control system comprising: a first control means for controlling the operation of the force distribution device; an electric power steering device having a motor for applying a steering assist torque to the vehicle steering system; and a second control means for calculating a motor control signal for driving the motor based on at least a steering torque signal detected by a steering torque detecting means, and for inhibiting drive of the motor based on at least a motor drive signal calculated based on the motor control signal and the steering torque signal; wherein the first control means calculates a correction signal for correcting the motor control signal based on an amount of control of the force distribution device and an offset signal for correcting the motor drive signal; and the second control means drives the motor based on a corrected motor control signal obtained by correcting the motor control signal with the correction signal and inhibits the drive of the motor based on a value obtained by correcting the motor drive signal with the offset signal and the steering torque signal, the offset signal being set smaller than a value obtained by converting the correction signal into an amount of motor drive.

In accordance with such control co-operative control system for a vehicle, again, since a corrected motor control signal is calculated by correcting a motor control signal calculated by the second control means of the electric power steering device with a correction signal calculated by the first control means based on the amount of control of the force distribution device, and the second control means drives the motor of the electric power steering device based on the corrected motor control signal, it is possible to simultaneously assist the steering operation of the driver and lessen the torque steer phenomenon. Moreover, since the offset signal for correcting the motor drive signal (obtained by converting the corrected motor control signal into the amount of drive of the motor) is set so as to be smaller than the value obtained by converting the correction signal into the amount of drive of the motor when it is determined that the drive of the motor should be inhibited, if the first control means malfunctions so outputting an inadequate correction signal, it is possible to effectively inhibit the drive of the motor and prevent the electric power steering device from generating a steering assist torque which would give the driver a disagreeable sensation.

In the embodiments of the present invention: a target current $I_{MS}$ corresponds to the motor control signal, corrected target current $I_{Ms}'$ corresponds to the corrected motor control signal, the amount of current correction $\Delta I$ corresponds to the correction signal, a driving force distribution device T corresponds to the force distribution device, a first electronic control unit $U_1$ corresponds to the first control means and a second electronic control unit $U_2$ corresponds to the second control means.

The above-mentioned objectives, as well as other objectives, characteristics and advantages of the present invention will become apparent from an explanation of presently preferred embodiments which will be described in detail below by reference to the attached drawings.

BRIEF DESCRIPTION OF THE DRAWINGS

FIGS. 1 to 9 illustrate a first embodiment of the present invention.

FIG. 1 is a schematic diagram showing the structure of the overall driving force distribution device of the embodiment.

FIG. 2 is a block diagram showing the configuration of the circuit of the first electronic control unit in FIG. 1.

FIG. 3 is a schematic diagram showing the action of the driving force distribution device of FIG. 1 when the vehicle is turning right at a medium to low speed.

FIG. 4 is a schematic diagram showing the action of the driving force distribution device of FIG. 1 when the vehicle is turning left at a medium to low speed.

FIG. 5 is a sketch showing the structure of the electric power steering device of the embodiment.

FIG. 6 is a block diagram showing the configuration of the circuit of the second electronic control unit in FIG. 1.

FIG. 7 is a map or graph for looking up the amount of current correction or the offset current from the torque distribution.

FIG. 8 is a map or graph for looking up the upper limit for the amount of current correction from the vehicle speed.

FIG. 11 is a block diagram showing the configuration of a modified circuit of the first electronic control unit similar to FIG. 2.

FIG. 12 is a block diagram showing the configuration of a modified circuit of the second electronic control unit similar to FIG. 6.

FIG. 13 is a map or graph for looking up the amount of current correction or the offset current from the torque distribution.

DETAILED DESCRIPTION OF PREFERRED EMBODIMENTS

Figure 1:
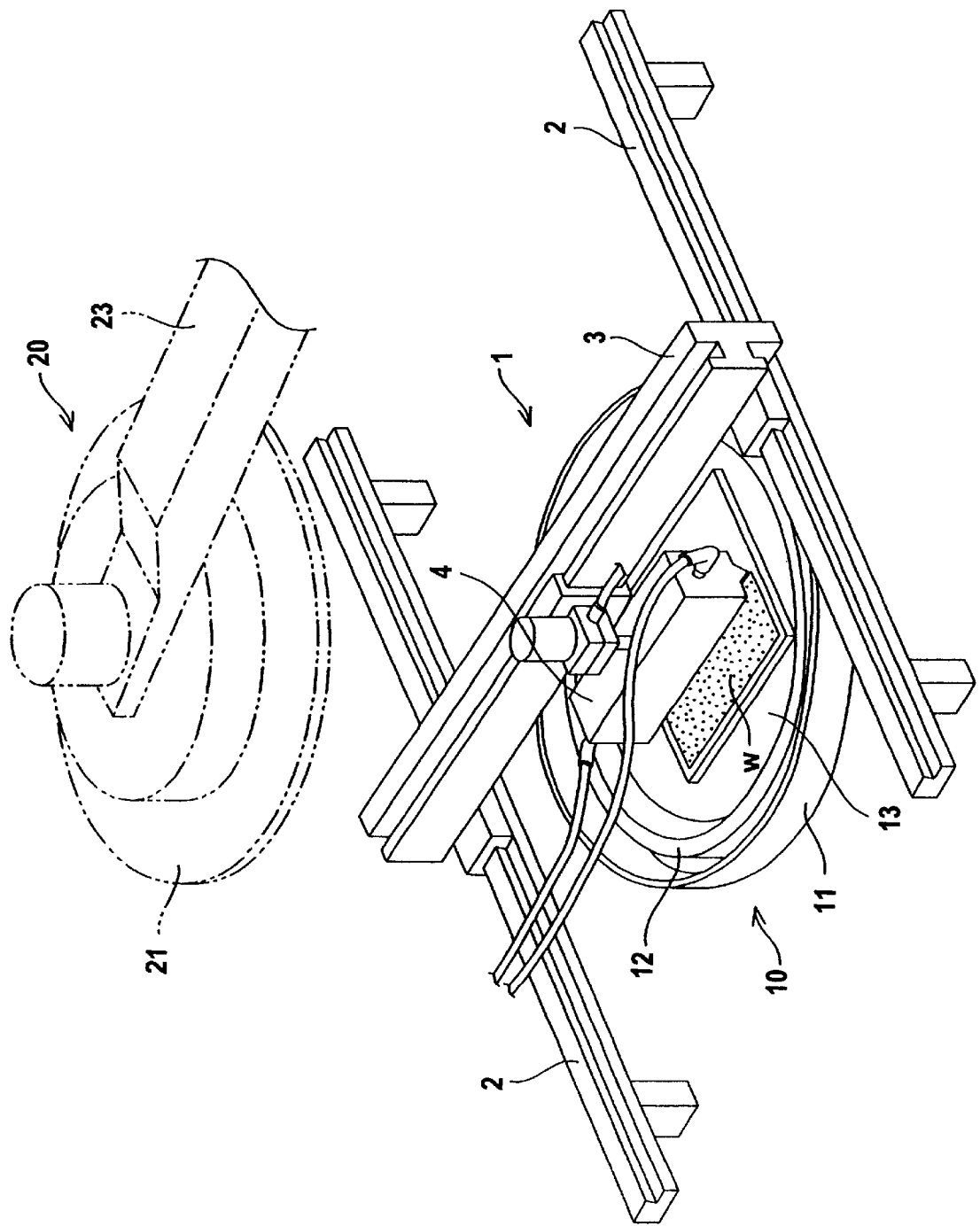

As shown in FIG. 1, a transmission M is connected to the right end of an engine E which is laterally mounted in the front part of the vehicle body of a front-engine/front-wheel drive vehicle, and a driving force distribution device T is placed to the rear of engine E and transmission M. A front right wheel $W_{FR}$ and a front left wheel $W_{FL}$ are connected to a right drive shaft $A_R$ and a left drive shaft $A_L$, respectively, which extend laterally from the right end and the left end of the driving force distribution device T.

The driving force distribution device T comprises a differential D to which the driving force is transmitted from an outer toothed gear 3 meshing with an input gear 2 provided on an input shaft 1 extending from the transmission M. The differential D employs a double pinion type planetary gear mechanism and comprises a ring gear 4 which is integrally formed with the above-mentioned outer toothed gear 3, a sun gear 5 which is provided coaxially inside the ring gear 4, and a planetary carrier 8 which supports an outer planetary gear 6 meshing with the above-mentioned ring gear 4 and an inner planetary gear 7 meshing with the above-mentioned sun gear 5, in a state in which they are meshed with each other. In the differential D the ring gear 4 functions as an input element while the sun gear 5, which functions as one of the output elements is connected to the front left wheel $W_{FL}$ via a left output shaft $9_L$. The planetary carrier 8 which functions as the other of the output elements, is connected to the front right wheel $W_{FR}$ via a right output shaft $9_R$.

A carrier member 11 which is supported on the outer circumference of the left output shaft $9_L$ in a rotatable manner comprises four pinion shafts 12 provided in the circumferential direction at 90° intervals, and each pinion shaft 12 supports in a rotatable manner a triad pinion member 16 in which a first pinion 13, a second pinion 14 and a third pinion 15 are integrally formed.

A first sun gear 17 meshing with the above-mentioned first pinion 13, which is supported in rotatable manner on the outer circumference of the left output shaft $9_L$, is linked to the planetary carrier 8 of the differential D. A second sun gear 18 which is fixed on the outer circumference of the left output shaft $9_L$ meshes with the above-mentioned second pinion 14. Furthermore, a third sun gear 19 which is supported in a rotatable manner on the outer circumference of the left output shaft $9_L$ meshes with the above-mentioned third pinion 15.

The numbers of teeth of the first pinion 13, the second pinion 14, the third pinion 15, the first sun gear 17, the second sun gear 18 and the third sun gear 19 in the embodiment are as follows.

| | |
|---|---|
| Number of teeth of the first pinion 13 | $Z_2 = 17$ |
| Number of teeth of the second pinion 14 | $Z_4 = 17$ |
| Number of teeth of the third pinion 15 | $Z_6 = 34$ |
| Number of teeth of the first sun gear 17 | $Z_1 = 32$ |
| Number of teeth of the second sun gear 18 | $Z_3 = 28$ |
| Number of teeth of the third sun gear 19 | $Z_5 = 32$ |

The third sun gear 19 can be connected to a casing 20 via a left hydraulic clutch $C_L$, and the rotational rate of a carrier member 11 is increased by engagement of the left hydraulic clutch $C_L$. The carrier member 11 can be connected to the casing 20 via a right hydraulic clutch $C_R$, and the rotational rate of the carrier member 11 is reduced by engagement of the right hydraulic clutch $C_R$. The above-mentioned right hydraulic clutch $C_R$ and left hydraulic clutch $C_L$ are controlled by a first electronic control unit $U_1$ containing a microcomputer.

Figure 2:
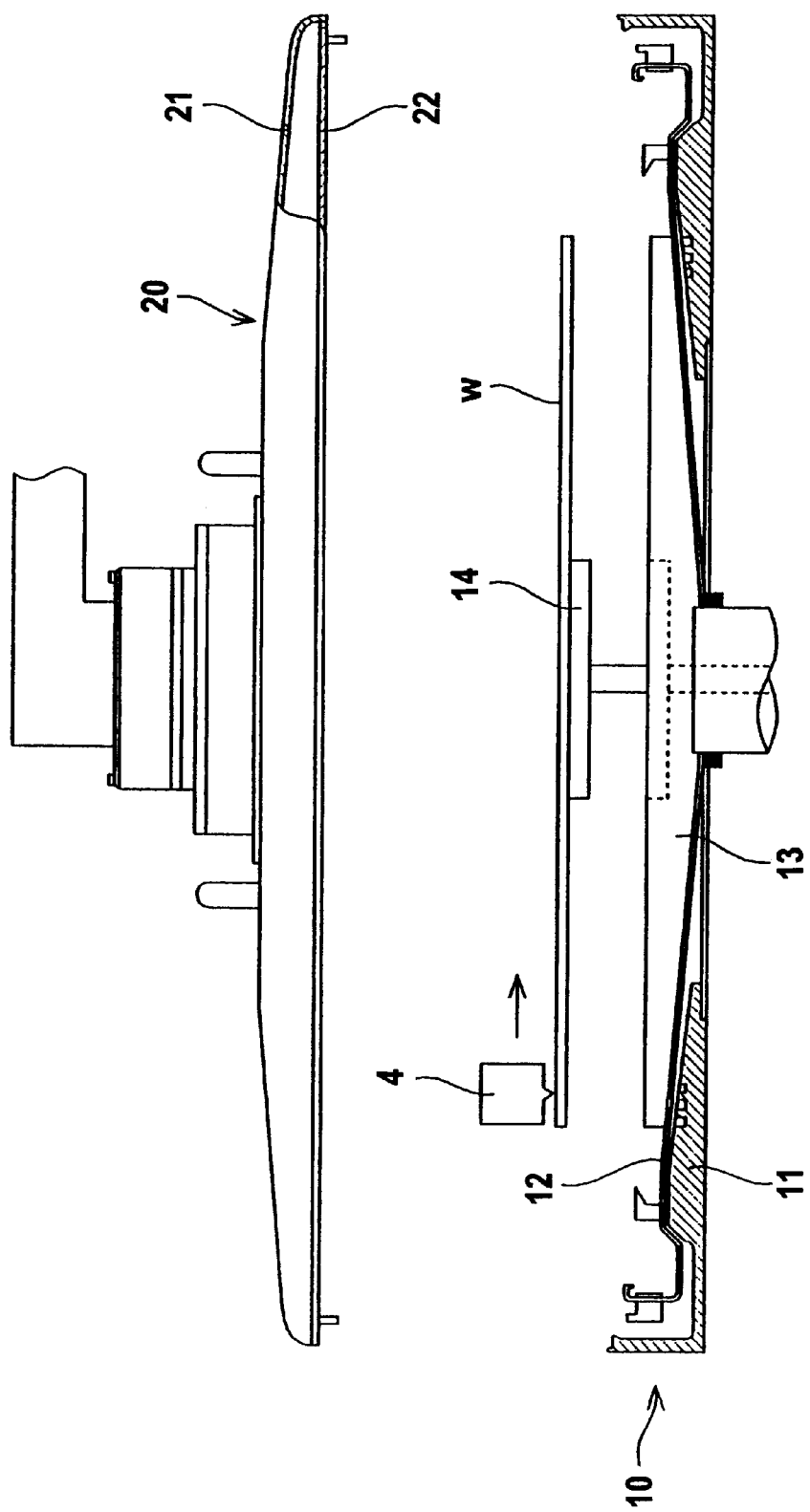

As shown in FIG. 2, signals from an engine torque detecting means $S_1$ for detecting the engine torque $T_E$, an engine rotational rate detecting means $S_2$ for detecting the rotational rate Ne of the engine E, a vehicle speed detecting means $S_3$ for detecting the vehicle speed V and a steering angle detecting means $S_4$ for detecting the steering angle θ are input into the first electronic control unit $U_1$. The first electronic control unit $U_1$ processes the signals from the above-mentioned detecting means $S_1$ to $S_4$ based on a predetermined program, thus controlling the above-mentioned left hydraulic clutch $C_L$ and right hydraulic clutch $C_R$.

The first electronic control unit $U_1$ comprises a drive shaft torque calculating means M1, a gear ratio calculating means M2, a first right and left distribution correction factor calculating means M3, a target yaw rate calculating means M4, a lateral acceleration calculating means M5, a second right and left distribution correction factor calculating means M6, a front right and left wheel torque calculating means M7, a current correction amount calculating means M8 and an offset current calculating means M13.

The drive shaft torque calculating means M1 calculates the drive shaft torque $T_D$ (that is to say, the total torque transmitted to the front right and left wheels $W_{FR}$, $W_{FL}$) by multiplying the engine torque $T_E$ by the gear ratio Ni produced by the gear ratio calculating means M2 from the rotational rate Ne of the engine and the vehicle speed V. The engine torque $T_E$ can be obtained from the intake pressure (or opening of the accelerator) and the rotational rate Ne of the engine, and the drive shaft torque $T_D$ can also be obtained by a means other than that mentioned above such as a torque detecting means provided on the power transmission system or the longitudinal acceleration of the vehicle. Furthermore, the vehicle speed V may be determined by a means other than the wheel speed such as an optical means using a spatial filter, or it may be determined using a Doppler radar.

The first right and left distribution correction factor calculating means M3 carries out a map look-up for a first right and left distribution correction factor $K_T$ based on the drive shaft torque $T_D$ and a second right and left distribution correction factor $K_V$ based on the vehicle speed V. The target yaw rate calculating means M4 carries out map look-up for the steering angle component $Y_1$ of the target yaw rate Y based on the steering angle θ and the vehicle speed component $Y_2$ of the target yaw rate Y based on the vehicle speed V, and calculates the target yaw rate Y by multiplying the steering angle component $Y_1$ by the vehicle speed component $Y_2$. The lateral acceleration calculating means M5 calculates the lateral acceleration $Y_G$ by multiplying the aforementioned target yaw rate Y by the vehicle speed V, and the second right and left distribution correction factor calculating means M6 carries out a map look-up for the right and left distribution correction factor G based on the above-mentioned lateral acceleration $Y_G$.

Finally, the front right and left wheel torque calculating means M7 calculates a distributed torque $T_L$ that is to be distributed to the front left wheel $W_{FL}$ and a distributed torque $T_R$ that is to be distributed to the front right wheel $W_{FR}$ based on the equations below.

$$T_L = (T_D/2) \times (1 + K_W \times K_T \times K_V \times G) \quad (1)$$

$$T_R = (T_D/2) \times (1 - K_W \times K_T \times K_V \times G) \quad (2)$$

Here, $K_V$ and $K_T$ denote the right and left distribution correction factors obtained by the first right and left distribution correction factor calculating means M3, G denotes the right and left distribution correction factor obtained by the second right and left distribution correction factor calculating means M6, and $K_W$ is a constant.

The term $(1 \pm K_W \times K_T \times K_V \times G)$ on the right hand side of equation (1) and equation (2) determines the torque distribution ratio between the front right and left wheels $W_{FR}$, $W_{FL}$, and when the torque distribution to one of the front right and left wheels $W_{FR}$, $W_{FL}$ increases by a predetermined amount, the torque distribution to the other of the front right and left wheels $W_{FR}$, $W_{FL}$ decreases by the above-mentioned predetermined amount.

When the distributed torques $T_R$, $T_L$ that are to be distributed to the front right and left wheels $W_{FR}$, $W_{FL}$ are determined as above-mentioned, the right hydraulic clutch $C_R$ and left hydraulic clutch $C_L$ are controlled so that the above-mentioned distributed torques $T_R$, $T_L$ are transmitted to the front right and left wheels $W_{FR}$, $W_{FL}$.

The distributed torques $T_R$, $T_L$ that are to be distributed to the right and left front wheels $W_{FR}$, $W_{FL}$ and which are calculated by the front right and left wheel torque calculating means M7 are input into the current correction amount calculating means M8. The current correction amount calculating means M8 inputs the distributed torques $T_R$, $T_L$ to the map shown in FIG. 7 and looks up the amount of current correction $\Delta I$ for the motor 27 of the electric power steering device S described below. The amount of current correction $\Delta I$ corresponds to current level necessary for the electric power steering device S to generate a steering torque that can counteract the torque-steer phenomenon caused by the distributed torques $T_R$, $T_L$ generated by the driving force distribution device T.

Figure 7:
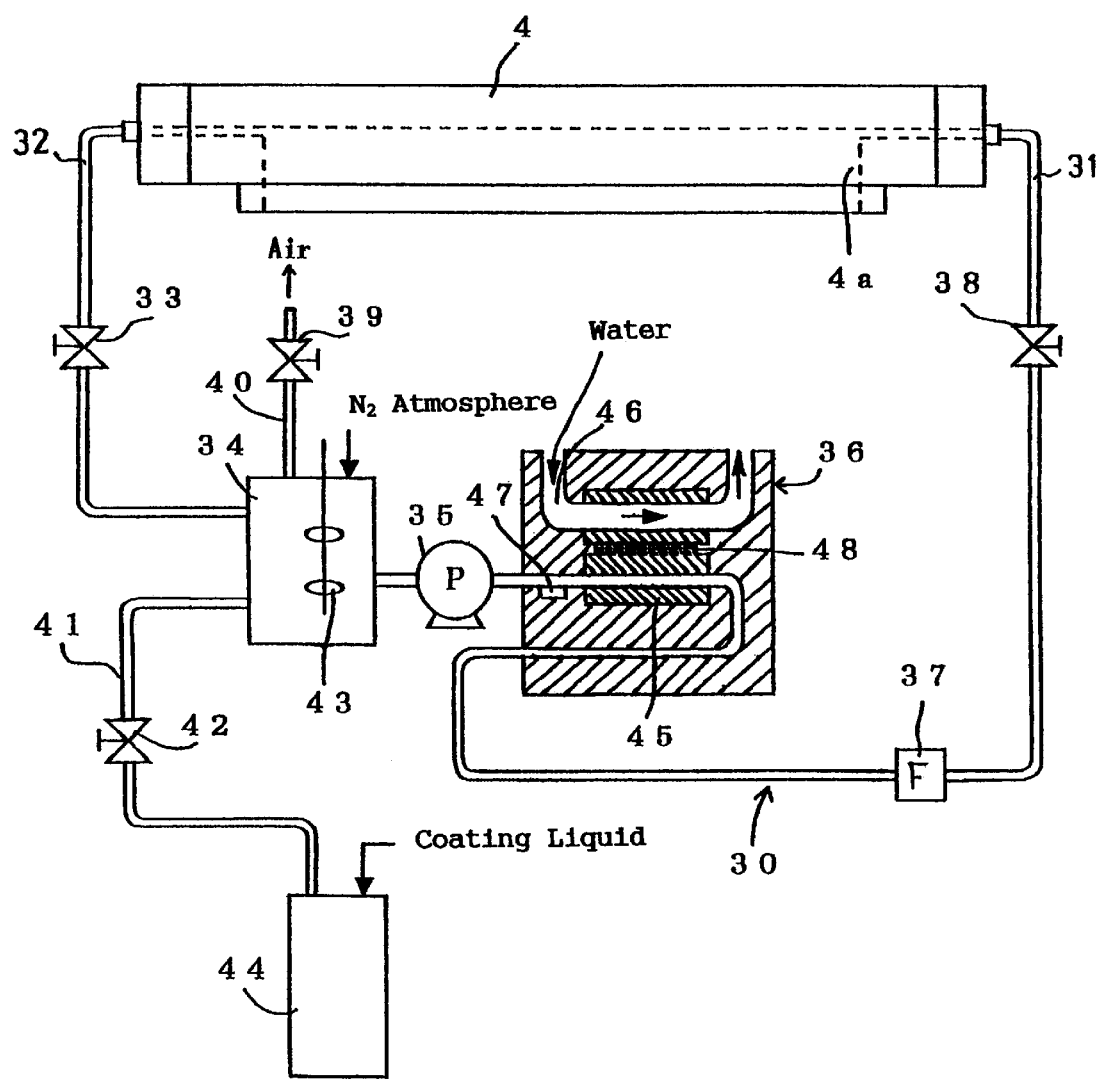

As is clear from FIG. 7, the amount of current correction $\Delta I$ increases linearly from 0 A to 22 A while the distributed torques $T_R$, $T_L$ increase from 20 kgfm to 70 kgfm, and when the distributed torques $T_R$, $T_L$ exceed 70 kgfm the amount of current correction $\Delta I$ is maintained at an upper limit value of 22 A. Although the maximum value for the current that is supplied to the motor 27 of the electric power steering device S for steering assist is 85 A, the upper limit value of 22 A for the amount of current correction $\Delta I$ is set so as to be smaller than the above-mentioned maximum value for the current.

The offset current calculating means M13 calculates an offset current $\Delta I_{OS}$ by reducing the amount of current correction $\Delta I$ calculated by the current correction amount calculating means M8 by a predetermined proportion. As is clear from FIG. 7, in the present embodiment the offset current $\Delta I_{OS}$ is set so as to be 0.7 times the amount of the current correction $\Delta I$. In addition, since the electric power steering device S has the characteristic that the higher the vehicle speed, the smaller the assist current, when the vehicle speed is less than 70 km/h the offset current $\Delta I_{OS}$ is set so as to be 0.7 times the amount of the current correction $\Delta I$, and when the vehicle speed is 70 km/h or higher the offset current $\Delta I_{OS}$ may be set so as to be 0.8 times the amount of the current correction $\Delta I$.

In accordance with a command from the first electronic control unit $U_1$, both the right hydraulic clutch $C_R$ and the left hydraulic clutch $C_L$ are in a disengaged state while the vehicle is travelling straight ahead. Thus, the carrier member 11 and the third sun gear 19 are not restrained, and the left drive shaft $9_L$, the right drive shaft $9_R$, the planetary carrier 8 of the differential D and the carrier member 11 all rotate in unison. At this time, the torque of the engine E is transmitted equally from the differential D to the front right and left wheels $W_{FR}$, $W_{FL}$ as shown by the hatched arrows in FIG. 1.

Figure 3:
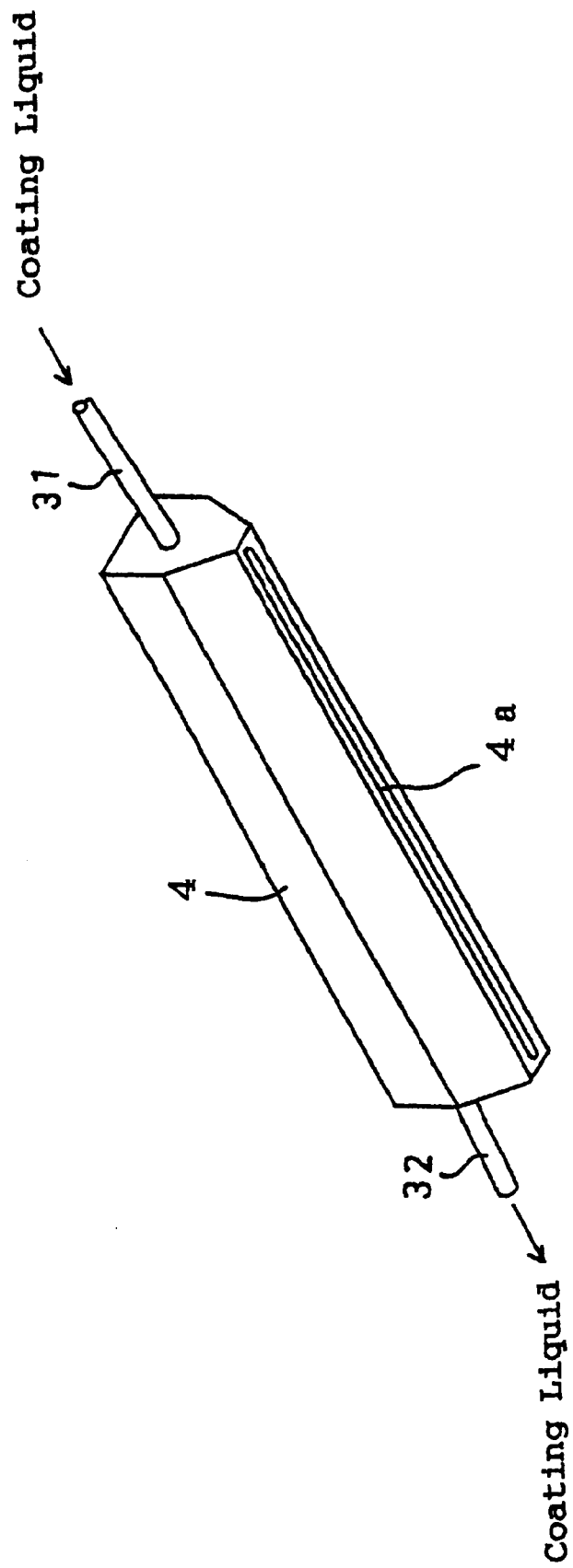

When the vehicle is turning right at a medium to low speed, as shown in FIG. 3 the right hydraulic clutch $C_R$ is engaged in accordance with a command from the first electronic control unit $U_1$ so as to stop the carrier member 11 by connecting it to the casing 20. At this time, since the left output shaft $9_L$ which is integrated with the front left wheel $W_{FL}$ and the right output shaft $9_R$ which is integrated with the front right wheel $W_{FR}$ (that is to say, the planetary carrier 8 of the differential D) are linked via the second sun gear 18, the second pinion 14, the first pinion 13 and the first sun gear 17, the rotational rate $N_L$ of the front left wheel $W_{FL}$ is increased relative to the rotational rate $N_R$ of the front right wheel $W_{FR}$ according to the relationship shown in the equation below.

$$N_L/N_R = (Z_4/Z_3) \times (Z_1/Z_2) = 1.143 \qquad (3)$$

When the rotational rate $N_L$ of the front left wheel $W_{FL}$ is increased relative to the rotational rate $N_R$ of the front right wheel $W_{FR}$ as above-mentioned, a proportion of the torque of the front right wheel $W_{FR}$ which is the inner turning wheel can be transmitted to the front left wheel $W_{FL}$ which is the outer turning wheel as shown by the hatched arrow in FIG. 3.

Instead of stopping the carrier member 11 by means of the right hydraulic clutch $C_R$, if the rotational rate of the carrier member 11 is reduced by appropriately adjusting the engagement force of the right hydraulic clutch $C_R$, the rotational rate $N_L$ of the front left wheel $W_{FL}$ can be increased relative to the rotational rate $N_R$ of the front right wheel $W_{FR}$ according to the deceleration, and the required level of torque can be transferred from the front right wheel $W_{FR}$ which is the inner turning wheel to the front left wheel $W_{FL}$ which is the outer turning wheel.

Figure 4:
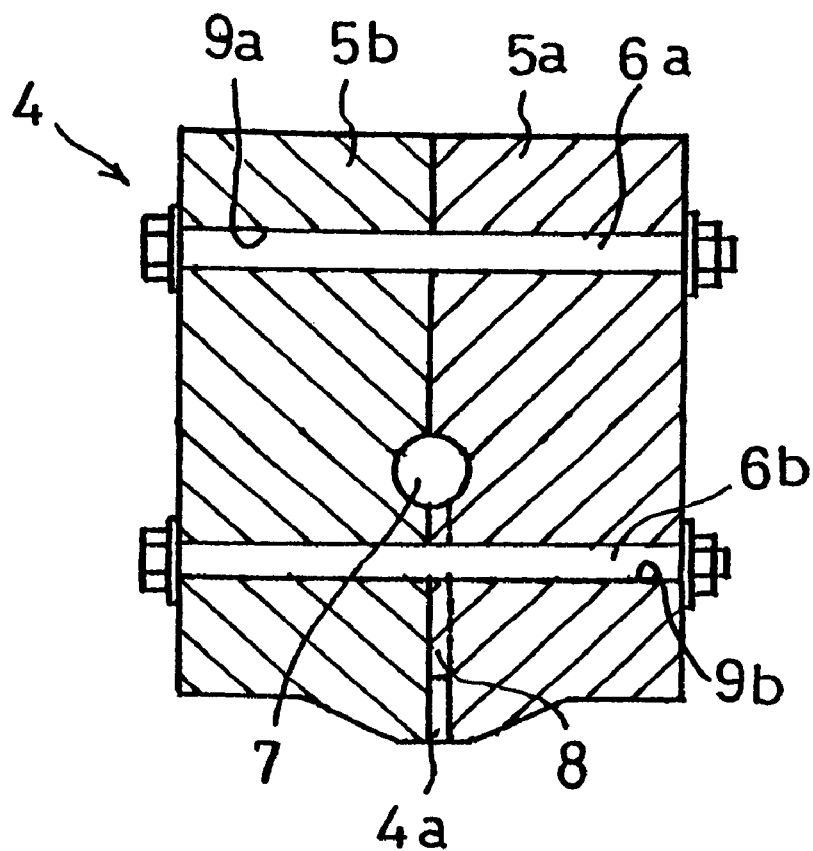

On the other hand, when the vehicle is turning left at a medium to low speed, as shown in FIG. 4, the left hydraulic clutch $C_L$ is engaged in accordance with a command from the first electronic control unit $U_1$ and the third pinion 15 is connected to the casing 20 via the third sun gear 19. As a result, the rotational rate of the carrier member 11 increases relative to the rotational rate of the left output shaft $9_L$, and the rotational rate $N_R$ of the front right wheel $W_{FR}$ is increased relative to the rotational rate $N_L$ of the front left wheel $W_{FL}$ in accordance with the relationship shown in the equation below.

$$N_R/N_L = \{1-(Z_5/Z_6) \times (Z_2/Z_1)\} \div \{1-(Z_5/Z_6) \times (Z_4/Z_3)\} = 1.167 \qquad (4)$$

As mentioned above, when the rotational rate $N_R$ of the front right wheel $W_{FR}$ increases relative to the rotational rate $N_L$ of the front left wheel $W_{FL}$, a proportion of the torque of the front left wheel $W_{FL}$, which is the inner turning wheel, can be transmitted to the front right wheel $W_{FR}$, which is the outer turning wheel, as shown by the hatched arrow in FIG. 4. In this case also, if the rotational rate of the carrier member 11 is increased by appropriately adjusting the engagement force of the left hydraulic clutch $C_L$, according to the acceleration, the rotational rate $N_R$ of the front right wheel $W_{FR}$ can be increased relative to the rotational rate $N_L$ of the front left wheel $W_{FL}$, and the required level of torque can be transferred from the front left wheel $W_{FL}$, which is the inner turning wheel, to the front right wheel $W_{FR}$, which is the outer turning wheel. It is thus possible to enhance the turning performance by transmitting a larger torque to the outer turning wheel than to the inner turning wheel at times when the vehicle is travelling at a medium to low speed. In addition, when the vehicle is travelling at a high speed it is possible to enhance the stability of travel by lessening the torque transmitted to the outer turning wheel in comparison with the above-mentioned case of a medium to low speed or alternatively by transferring torque from the outer turning wheel to the inner turning wheel. This can be achieved in the first right and left distribution correction factor calculating means M3 of the first electronic control unit $U_1$ by setting the map of the second right and left distribution correction factor $K_V$ relative to vehicle speed V.

As is clear from a comparison of equation (3) with equation (4), since the numbers of teeth of the first pinion 13, the second pinion 14, the third pinion 15, the first sun gear 17, the second sun gear 18 and the third sun gear 19 are set as above-mentioned, the ratio (about 1.143) of the rotational speed of the front left wheel $W_{FL}$ to the rotational speed of the front right wheel $W_{FR}$ and the ratio (about 1.167) of the rotational speed of the front right wheel $W_{FR}$ to the rotational speed of the front left wheel $W_{FL}$ can be substantially equalized to each other.

When changes are made in the driving forces which are distributed from the engine E to the front right and left wheels $W_{FR}$, $W_{FL}$ via the driving force distribution device T, undesirable steering forces are produced in the front right and left wheels $W_{FR}$, $W_{FL}$, which are steered wheels, due to the so-called torque steer phenomenon. In a vehicle containing an electric power steering device S, if the torque steer phenomenon is caused due to the operation of the driving force distribution device T, then by operating the electric power steering device S so as to cancel the steering force due to the torque steer phenomenon and generate a steering assist torque in the opposite direction, the above-mentioned torque steer phenomenon can be lessened.

Figure 5:
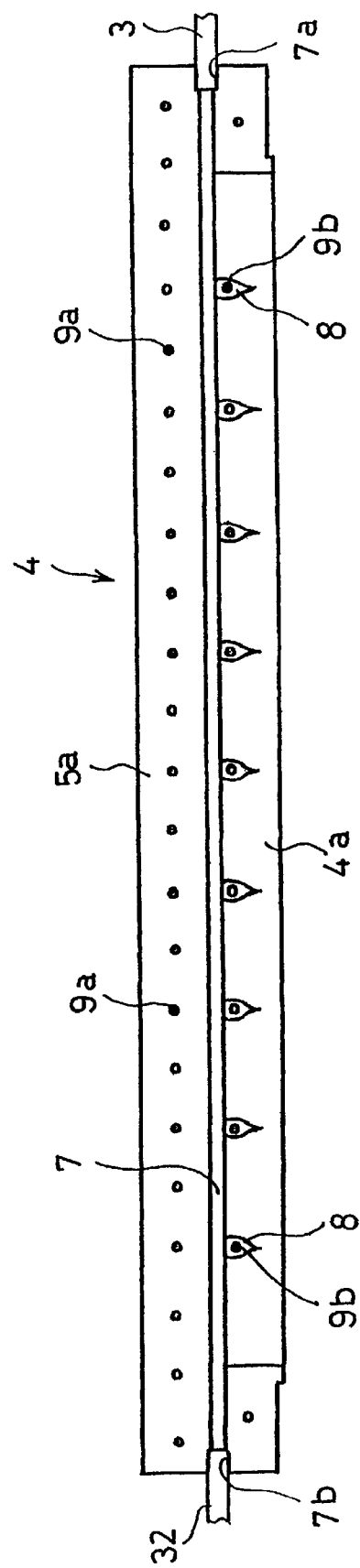

Next, an explanation of a vehicle steering system is given based on FIG. 5.

A steering torque which is input into a steering wheel 21 by a driver is transmitted to a rack 25 via a steering shaft 22, a connecting shaft 23 and a pinion 24, and the reciprocating motion of the rack 25 is further transmitted to the front right and left wheels $W_{FR}$, $W_{FL}$ via right and left tie rods 26, 26 so as to steer the front wheels $W_{FR}$, $W_{FL}$. An electric power steering device S provided in the vehicle's steering system comprises a drive gear 28 provided on an output shaft of a motor 27, a driven gear 29 meshing with the drive gear 28, a screw shaft 30 which is integral with the driven gear 29, and a nut 31 which meshes with the screw shaft 30 and is also connected to the above-mentioned rack 25.

A second electronic control unit $U_2$ does not control the operation of the electric power steering device S by itself, but it co-operatively controls the operation of the electric power steering device S in conjunction with the operation of the driving force distribution device T.

Figure 6:
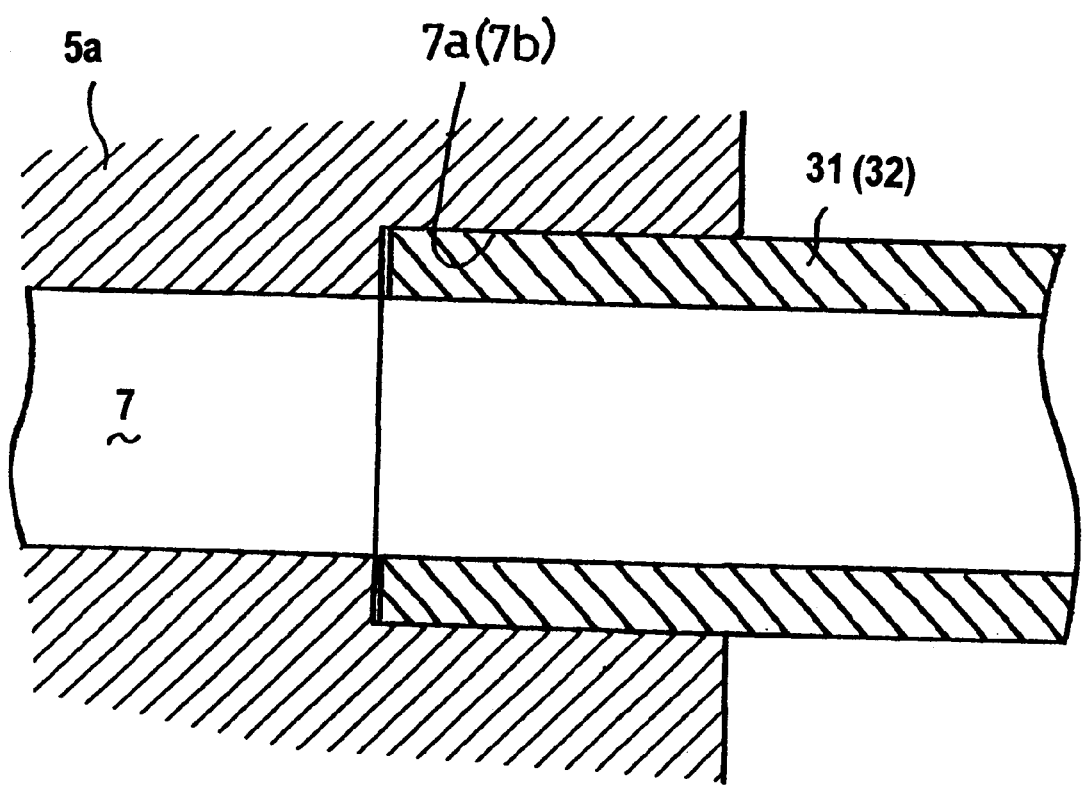

As shown in FIG. 6, the second electronic control unit $U_2$ comprises a target current setting means M9, a drive control means M10, a drive inhibition means M11, a drive inhibition determining means M12, an upper limit checking means M14, a current correction amount reducing means M15, a calculation checking means M16 and a subtraction means 33.

The upper limit checking means M14 checks that the amount of current correction ΔI and the offset current $ΔI_{OS}$ input from the first electronic control unit $U_1$ are definitely not higher than 22 A, and the calculation checking means M16 checks that the offset current $ΔI_{OS}$ is definitely 0.7 times the amount of the current correction ΔI. When an abnormality is observed in the above-mentioned checking, it is determined that there is a malfunction and, for example, operation of the driving force distribution device T is suspended.

The current correction amount reducing means M15 reduces the amount of current correction ΔI input from the upper limit checking means M14 based on the vehicle speed V detected by the vehicle speed detecting means $S_3$. As is clear from FIG. 8, the limit value for the amount of current correction ΔI is set so as to be 22 A toward zero in the low and medium vehicle speed region wherein the vehicle speed V is from 0 km/h to 80 km/h, and it is set so as to linearly decrease from 22 A in the high vehicle speed region wherein the vehicle speed V is 80 km/h or higher. In the case where the amount of current correction ΔI which has been input from the upper limit checking means M14 into the current correction amount reducing means M15 exceeds the limit in FIG. 8, the amount of current correction ΔI is restricted by the limit value and decreases. That is to say, the amount of current correction ΔI decreases according to an increase in the vehicle speed V.

The target current setting means M9 carries out a map look up for the target current $I_{MS}$ for driving the motor 27 of the electric power steering device S based on the vehicle speed V which is input from the vehicle speed detecting means $S_3$ and the steering torque $T_Q$ which is input from the steering torque detecting means $S_5$. The target current $I_{MS}$ is set so as to increase in response to an increase in the steering torque $T_Q$ and increase in response to a decrease in the vehicle speed V, and these characteristics allow a steering assist torque to be generated according to the travel state of the vehicle.

The target current $I_{MS}$ which is output from the target current setting means M9 and the amount of current correction ΔI' which is output from the current correction amount reducing means M15 are input into the subtraction means 33, in which the amount of current correction ΔI' is subtracted from the target current $I_{MS}$ so as to give a corrected target current $I_{MS}'$ (=$I_{MS}$−ΔI'). In the case where a steering force is applied due to operation of the driving force distribution device T in the same direction as that of the steering operation by the driver, the corrected target current $I_{MS}'$ is calculated by subtracting the amount of current correction ΔI' from the target current $I_{MS}$, but in the case where a steering force is applied in the direction opposite to that of the steering operation by the driver, the corrected target current $I_{MS}'$ may be calculated by adding the amount of current correction ΔI' to the target current $I_{MS}$.

The drive control means M10 converts the corrected target current $I_{MS}'$ into a motor drive signal $V_D$ and outputs the motor drive signal $V_D$ to the drive inhibition means M11. When no drive inhibition signal is input from the drive inhibition determining means M12, the drive inhibition means M11 outputs the above-mentioned motor drive signal $V_D$ to the motor driver 32 so as to drive the motor 27 at a motor voltage $V_M$ and thus a steering assist torque is generated in the electric power steering device. By controlling the electric power steering device S based on the corrected target current $I_{MS}'$ calculated from the target current $I_{MS}$ and the amount of current correction ΔI' it becomes possible to simultaneously lessen the torque steer phenomenon and assist the steering operation by the driver, which is the primary function of the electric power steering device S.

Since the amount of current correction ΔI' which is input from the current correction amount reducing means M15 into the subtraction means 33 decreases in response to an increase in the vehicle speed V (see FIG. 8), in the case where an erroneous amount of current correction ΔI is output due to a malfunction of the first electronic control unit $U_1$ of the driving force distribution device T at a high vehicle speed, at which the effect of steering is large, the generation of a steering torque by the electric power steering device S at such a level that the driver experiences a disagreeable sensation can be prevented. For example, when the vehicle is travelling straight ahead and the driving force distribution device T is in a non-operational state, since the distributed torques $T_R$, $T_L$ are equal the amount of current correction ΔI should be 0. If an amount of current correction ΔI is output due to a malfunction of the first electronic control unit $U_1$ in such circumstances, although the electric power steering device S generates an unnecessary steering torque, since the current correction amount reducing means M15 outputs an amount of current correction ΔI' to the subtraction means 33, which is obtained by reducing the amount of current correction ΔI in response to an increase in the vehicle speed V, the unnecessary steering torque generated by the electric power steering device S at a high vehicle speed can be reduced and the disagreeable sensation experienced by the driver can be lessened.

On the other hand, in the case where an abnormality such as a malfunction of the control system occurs, a drive inhibition signal is input from the drive inhibition determining means M12 into the drive inhibition means M11, the drive inhibition means M11 inhibits the output of the above-mentioned motor drive signal $V_D$ and the operation of the electric power steering device S, and thus the electric power steering device S is prevented from generating a steering assist torque which is not anticipated by the driver. The drive inhibition determining means M12, together with the torque detecting means $S_5$ the upper limit checking means M14, and the calculation checking means M16, function as means for determining a malfunction of the electric power steering device or the second control means U2.

An actual motor current $I_M$ which is detected by a current detecting means $S_6$ and supplied to the motor 27, a steering torque $T_Q$ detected by a steering torque detecting means $S_5$ and an offset current $\Delta I_{OS}$ which is output from the calculation checking means M16, are input into the drive inhibition determining means M12. The drive inhibition determining means M12 determines whether or not the drive of the electric power steering device S is inhibited by inputting the actual motor current $I_M$ and the steering torque $T_Q$ to a map which has been corrected based on the offset current $\Delta I_{OS}$.

Figure 9A:
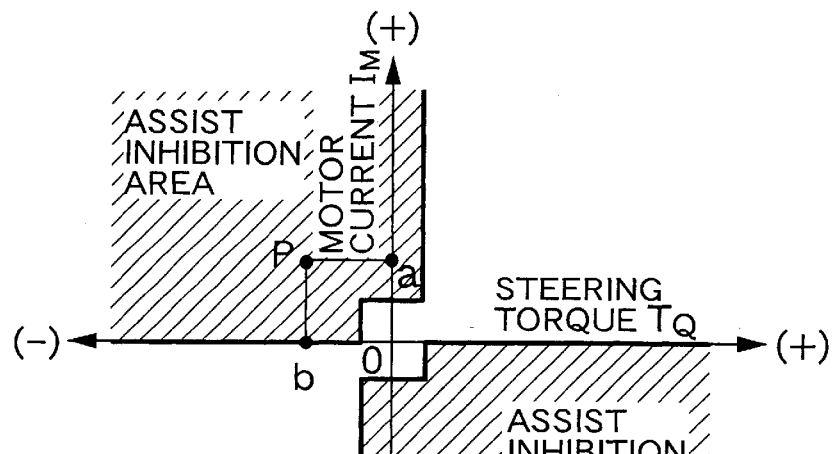
FIG. 9A to FIG. 9C are maps or graphs for looking up the area in which the operation of the electric power steering device is inhibited.

FIG. 9A is a map of the art for carrying out the above-mentioned inhibition determination, and this map was originally prepared for a vehicle not containing a driving force distribution device T, that is to say, a vehicle in which co-operative control of an electric power steering device S and a driving force distribution device T was not carried out. In the figure the abscissa denotes the steering torque $T_Q$ detected by the steering torque detecting means $S_5$ and the ordinate denotes the actual motor current $I_M$ detected by the current detecting means $S_6$. The region on the right-hand side of the origin on the abscissa in which the steering torque $T_Q$ is positive (+) corresponds to a case in which a steering torque in the direction for turning right is input into the steering wheel 21, and the region on the left-hand side of the origin on the abscissa in which the steering torque $T_Q$ is negative (−) corresponds to a case in which a steering torque in the direction for turning left is input into the steering wheel 21. The region above the origin on the ordinate in which the actual motor current $I_M$ is positive (+) corresponds to a case in which the motor 27 outputs a torque in the direction for turning right, and the region below the origin on the ordinate in which the actual motor current $I_M$ is negative (−) corresponds to a case in which the motor 27 outputs a steering torque in the direction for turning left. When the steering torque $T_Q$ and the actual motor current $I_M$ are in the hatched assist inhibition regions, the drive inhibition determining means M12 outputs a command to inhibit the drive of the motor 27 to the drive inhibition means M11.

For example, when the motor 27 is driven in the direction for turning right by a large current due to a malfunction of the second electronic control unit $U_2$ despite the driver not carrying out a steering operation, the actual motor current $I_M$ at that time is in position 'a' in the (+) region. Since the motor 27 is driven in the direction for turning right against the driver's will, the driver attempts to drive the vehicle in a straight line by applying a strong steering torque $T_Q$ in the direction for turning left to the steering wheel 21 and, therefore, the steering torque $T_Q$ detected by the steering torque detecting means $S_5$ corresponds to position 'b' in the (−) region. As a result, the actual motor current $I_M$ and the steering torque $T_Q$ have a relationship denoted by the point P in FIG. 9A and enter the hatched assist inhibition region, the drive inhibition determining means M12 outputs a command to inhibit the drive of the motor 27 and thus it is possible to prevent the electric power steering device S from generating an undesirable steering assist torque.

The above-mentioned explanation applies to a vehicle in which co-operative control of the electric power steering device S and the driving force distribution device T is not carried out, but vehicles which carry out co-operative control have the following disadvantages. That is to say, since the actual motor current $I_M$ in a vehicle which carries out co-operative control includes a current component for assisting the steering operation of the driver and a current component for lessening the torque steer phenomenon, if the map in FIG. 9A, in which the current component for lessening the torque steer phenomenon is not considered, is used as it is, there is a possibility that an erroneous determination might be made and the operation of the electric power steering device S might be inhibited when its operation is necessary or the operation of the electric power steering device S might be permitted when its operation is unnecessary.

For example, in a vehicle which carries out co-operative control, there are cases in which steering assist is permitted even in regions in which the direction of the steering torque $T_Q$ is opposite to the direction of the actual motor current $I_M$ (the second and fourth quadrants in FIG. 9A). This is because a torque steer phenomenon in the same direction as the steering direction is caused by the operation of the driving force distribution device T. Considering a case in which the amount of current correction $\Delta I$ in the opposite direction to the torque steer phenomenon that is required in order to counteract it is larger than the target current $I_{MS}$ of the electric power steering device S, if the map in FIG. 9A is used as it is, since the steering assist is inhibited, it is impossible to counteract the torque steer phenomenon.

Figure 9B:
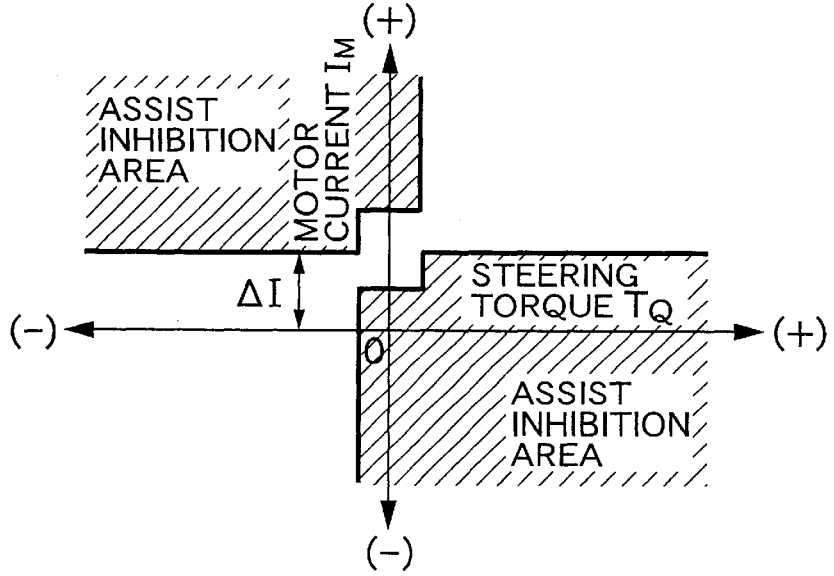

In order to avoid the above-mentioned situation, as shown in FIG. 9B, the assist inhibition area may be shifted upwards in the ordinate direction by an amount corresponding to the amount of current correction $\Delta I$. By so doing it is possible to cause an amount of steering torque, in the direction opposite to the steering direction, corresponding to the amount of current correction $\Delta I$ in the electric power steering device S and thus cancel the torque steer phenomenon accompanying the operation of the driving force distribution device T.

However, when the map which is used for determining the drive inhibition of the electric power steering device S is shifted upwards in the ordinate direction by an amount corresponding to the amount of current correction $\Delta I$ as shown in FIG. 9B above-mentioned, the following disadvantages may occur. For example, taking a case where, since the vehicle is travelling straight ahead, the distributed torques $T_L$, $T_R$ generated by the driving force distribution device T are equal, and since the driver is not operating the steering system current $I_{MS}$ is zero, an amount of current correction $\Delta I$ which should theoretically be zero is output due to a malfunction of the first electronic control unit $U_1$. The amount of this abnormal current correction $\Delta I$ exceeding 22 A is cut by the upper limit checking means M14, but the electric power steering device S is operated by an amount of current correction $\Delta I$ of 22 A, which is the maximum value allowed through the upper limit checking means M14, and there is a possibility that a disagreeable sensation may be experienced by the driver. In particular, when the vehicle is travelling at high speed, since the change in vehicle behaviour caused by a steering operation is large, the disagreeable sensation experienced by the driver becomes large.

In order to solve this disadvantage, in the present embodiment the offset current calculation means M13 provided in the first electronic control unit $U_1$ of the driving force distribution device T calculates an offset current $\Delta I_{OS}$ by reducing the amount of current correction $\Delta I$ (see FIG. 7), and the assist inhibition areas are shifted in the ordinate direction by an amount corresponding to the aforementioned offset current $\Delta I_{OS}$. As a result, the map that is used for determining the inhibition of the drive of the electric power steering device S is that shown in FIG. 9C.

Figure 9C:
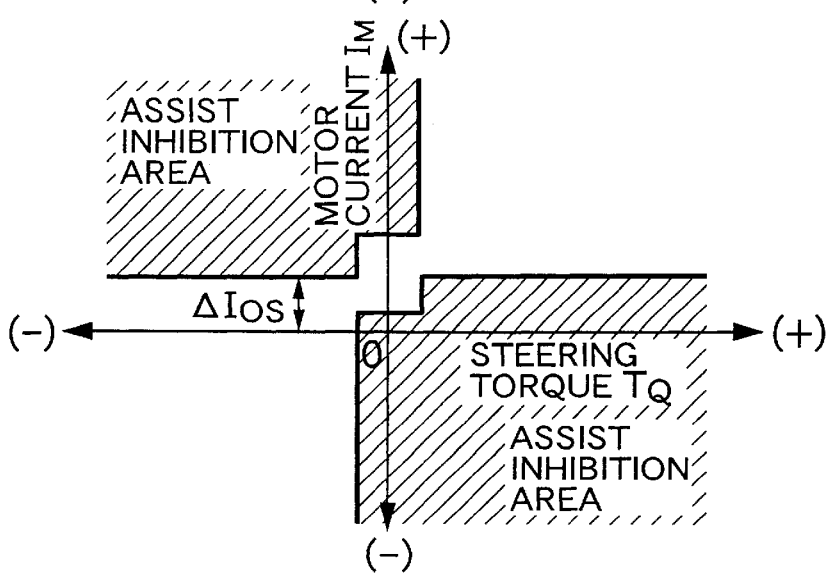

FIG. 9C should be compared with FIG. 9B. In FIG. 9B, in which the assist inhibition areas are shifted in the ordinate direction by an amount corresponding to the amount of current correction $\Delta I$, when a steering assist force exceeding the amount of current correction $\Delta I$ (maximum 22 A) is generated in the opposite direction, it is determined that the drive of the electric power steering device S is inhibited, whereas when a steering assist force which is only slightly smaller than the aforementioned 22 A is generated in the opposite direction, the drive of the electric power steering device S might be permitted in some cases. On the other hand, in FIG. 9C an offset current $\Delta I_{OS}$ which is obtained by reducing the amount of current correction $\Delta I$ to 70% is employed, the amount by which the assist inhibition areas are shifted in the ordinate direction is 70% of that in FIG. 9B, and when a steering assist force exceeding the maximum value of 22 A×0.7=15.4 A is generated in the opposite direction, it is determined that the drive of the electric power steering device S is inhibited.

As hereinbefore described, by setting the offset current $\Delta I_{OS}$ so as to be smaller than the amount of current correction $\Delta I$, the operation of the electric power steering device S can be inhibited at a point where the actual motor current $I_M$ exceeds the offset current $\Delta I_{OS}$, and whereby alleviating a disagreeable sensation experienced by the driver. Thus, if the first electronic control unit $U_1$ of the driving force distribution device T malfunctions while co-operative control between the driving force distribution device T and the electric power steering device S is enabled, it is possible to prevent the electric power steering device S from generating a large degree of steering assist force so giving a disagreeable sensation to the driver.

Next, a second embodiment of the present invention is explained by reference to FIG. 10, which is a schematic block diagram of the circuit of the second electronic control unit, similar to that of the first embodiment shown in FIG. 6.

In the aforementioned first embodiment, the actual motor current $I_M$ is used for determining whether or not the drive of the motor 27 of the electric power steering device S is inhibited, but in the present embodiment while considering the proportional relationship between the motor drive signal $V_D$ output from the drive control means M10' and the aforementioned actual motor current $I_M$, the motor drive signal $V_D$ is used instead of the actual motor current $I_M$ to give the same effects as those obtained in the first embodiment.

More specifically, the first electronic control unit $U_1$ of the driving force distribution device T calculates the correction current $\Delta I$ and the offset signal $\Delta V_{OS}$ corresponding to the correction current $\Delta I$ and the upper limit checking means M14 and the calculation checking means M16 of the second electronic control unit $U_2$ of the electric power steering device S check whether or not the offset signal $\Delta V_{OS}$ is below a predetermined upper limit value. Moreover, the drive inhibition determining means M12 into which the motor drive signal $V_D$ output from the drive control means M10, the driving torque $T_Q$ output from the driving torque detecting means $S_5$ and the aforementioned offset signal $\Delta V_{OS}$ are input determines whether or not the motor drive signal $V_D$ and the driving torque $T_Q$ are in the assist inhibition area. The map used in this case is substantially the same as the map (ref. FIG. 9C) used in the first embodiment and corresponds to that in which the ordinate is changed from 'the actual motor current $I_M$ to 'the motor drive signal $V_D$ and the degree of shift in the ordinate direction is changed from 'the offset $\Delta I_{OS}$ to 'the offset signal $\Delta V_{OS}$.

Thus, in the second embodiment also, when cooperative control between the driving force distribution device T and the electric power steering device S is enabled, if the first electronic control unit $U_1$ of the driving force distribution device T malfunctions and an abnormal correction current $\Delta I$ is output, operation of the electric power steering device S is effectively inhibited so lessening the disagreeable sensation experienced by the driver.

In order to effectively lessen the torque steer phenomenon which accompanies the operation of the driving force distribution device, it is necessary to output a correction signal for correcting the motor control signal from the control means of the driving force distribution device to the control means of the electric power steering device without any delay. However, since the extent to which the communication cycle between the aforementioned two control means can be reduced is limited, the generation of a steering assist torque by the correction signal is delayed with the consequence that the torque steer phenomenon cannot be completely suppressed, and there is a possibility that the driver might experience a disagreeable sensation. In order to prevent this, setting the correction signal so as to be larger than the value required to counteract the torque steer phenomenon has been considered. However, when the torque steer phenomenon is small because of a small degree of driving force distribution by the driving force distribution device, if a large correction signal is output due to an erroneous estimation of the degree of driving force distribution, an unexpected steering assist torque is caused and there is a possibility that the driver might experience a disagreeable sensation.

Therefore, with regard to a co-operative control system for a vehicle for lessening the torque steer phenomenon by co-operatively controlling a force distribution device and an electric power steering device, it is necessary to prevent a large steering assist torque from being generated in a region in which the degree of force distribution is small, because such a large steering assist torque would give the driver a disagreeable sensation. A co-operative control system for a vehicle comprising a configuration which meets the above-mentioned requirement is explained below by reference to FIG. 11 to FIG. 13.

Figure 11:
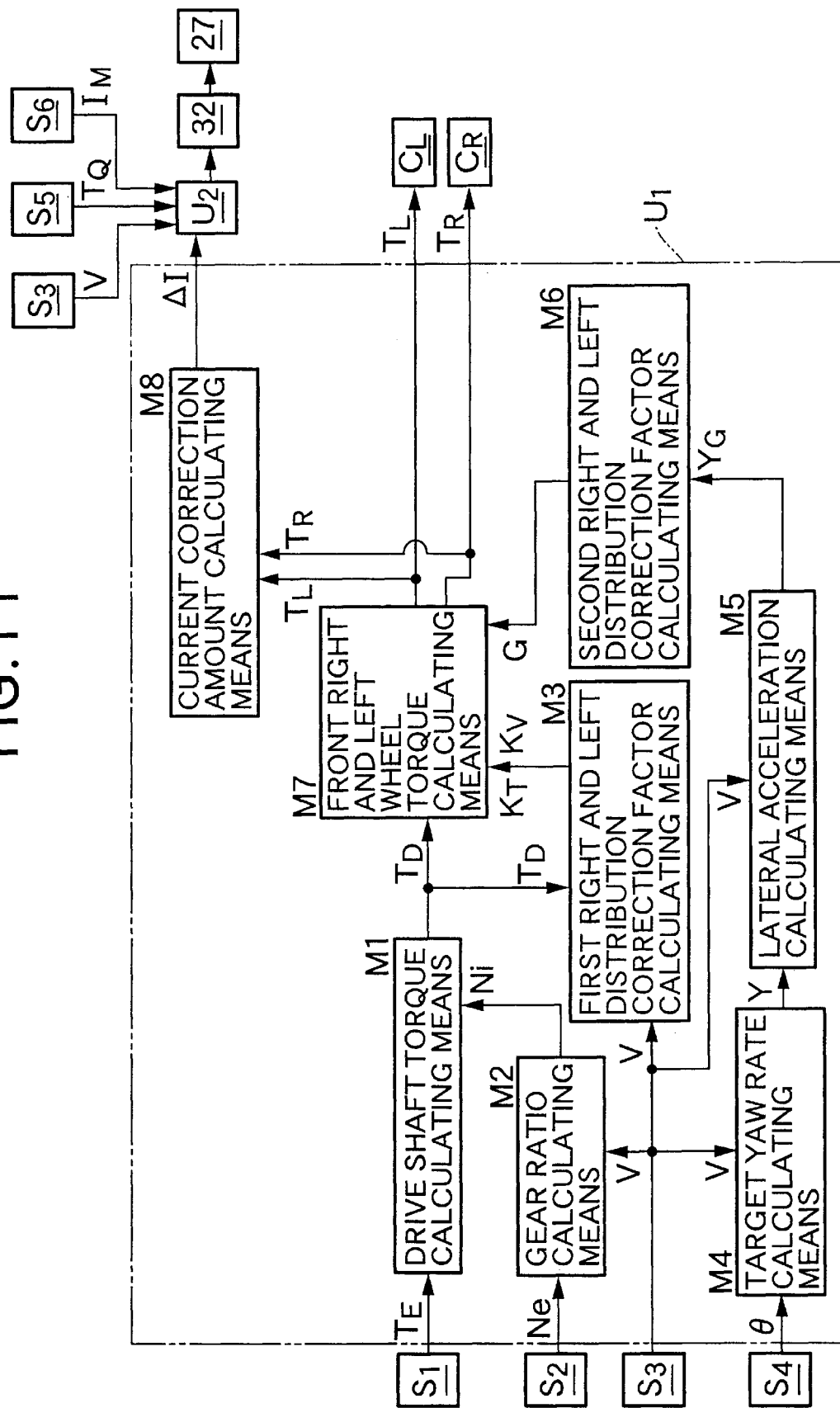
FIG. 11 to FIG. 13 illustrate techniques related to the present invention.

As is clear from comparison of FIG. 11 with FIG. 2 (the first embodiment), a first electronic control unit $U_1$ shown in FIG. 11 is different from the first electronic control unit $U_1$ of the first embodiment in that it comprises no offset current calculating means M13. The current correction amount calculating means M8" shown in FIG. 11 looks up the amount of current correction $\Delta I$ for the motor 27 of the electric power steering device S as described below.

Figure 13:
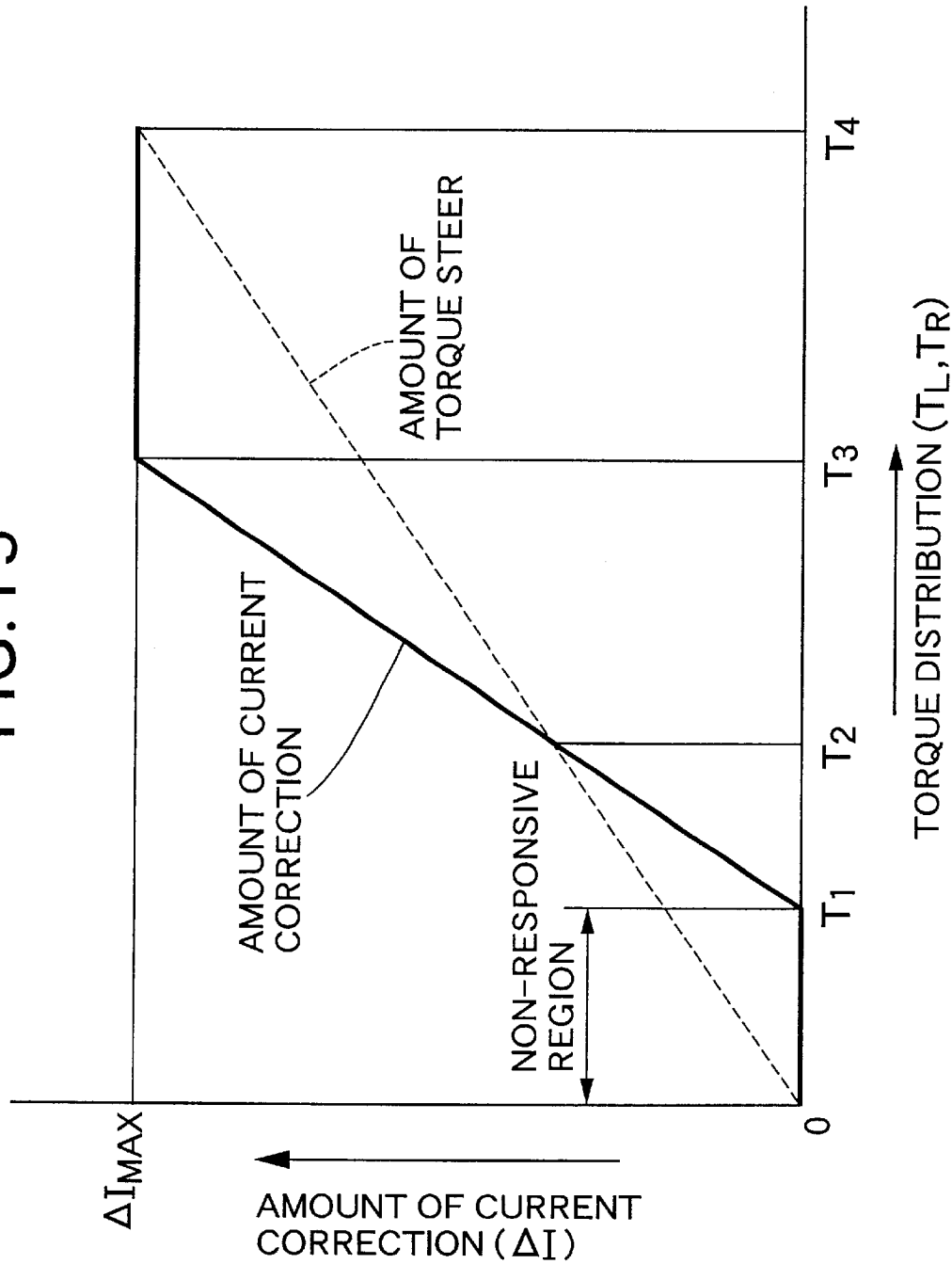
Figure 1:
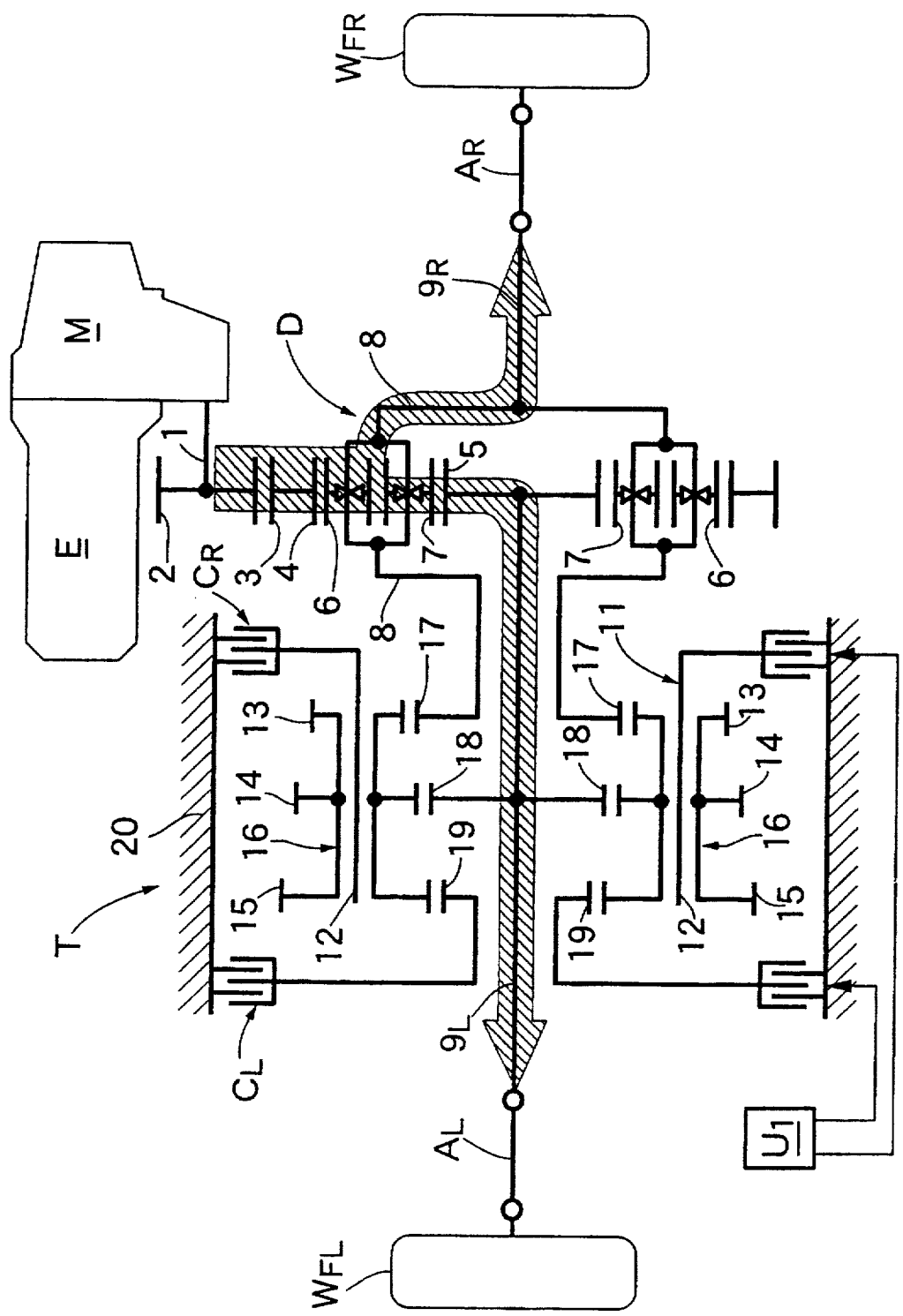
Figure 2:
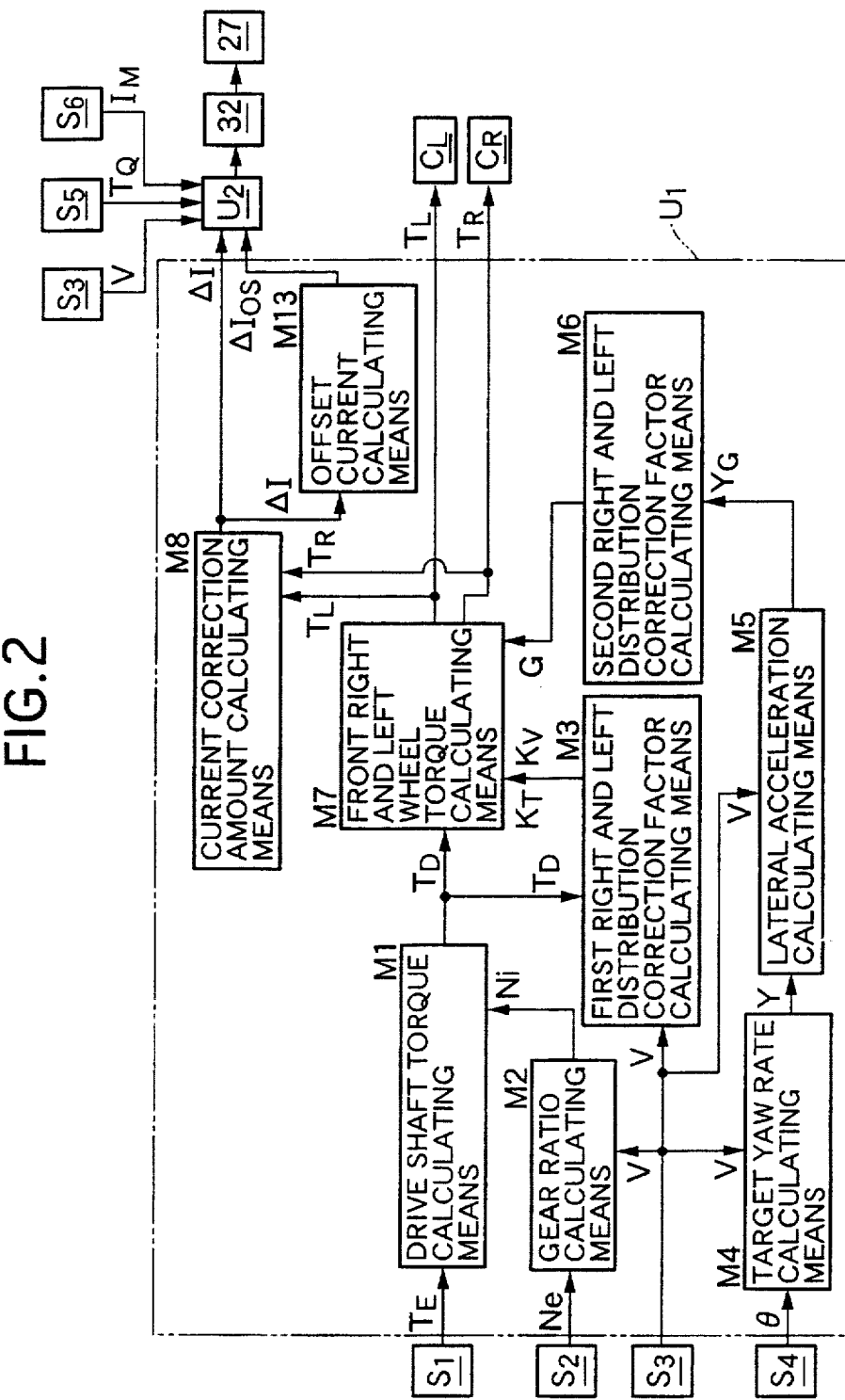
Figure 3:
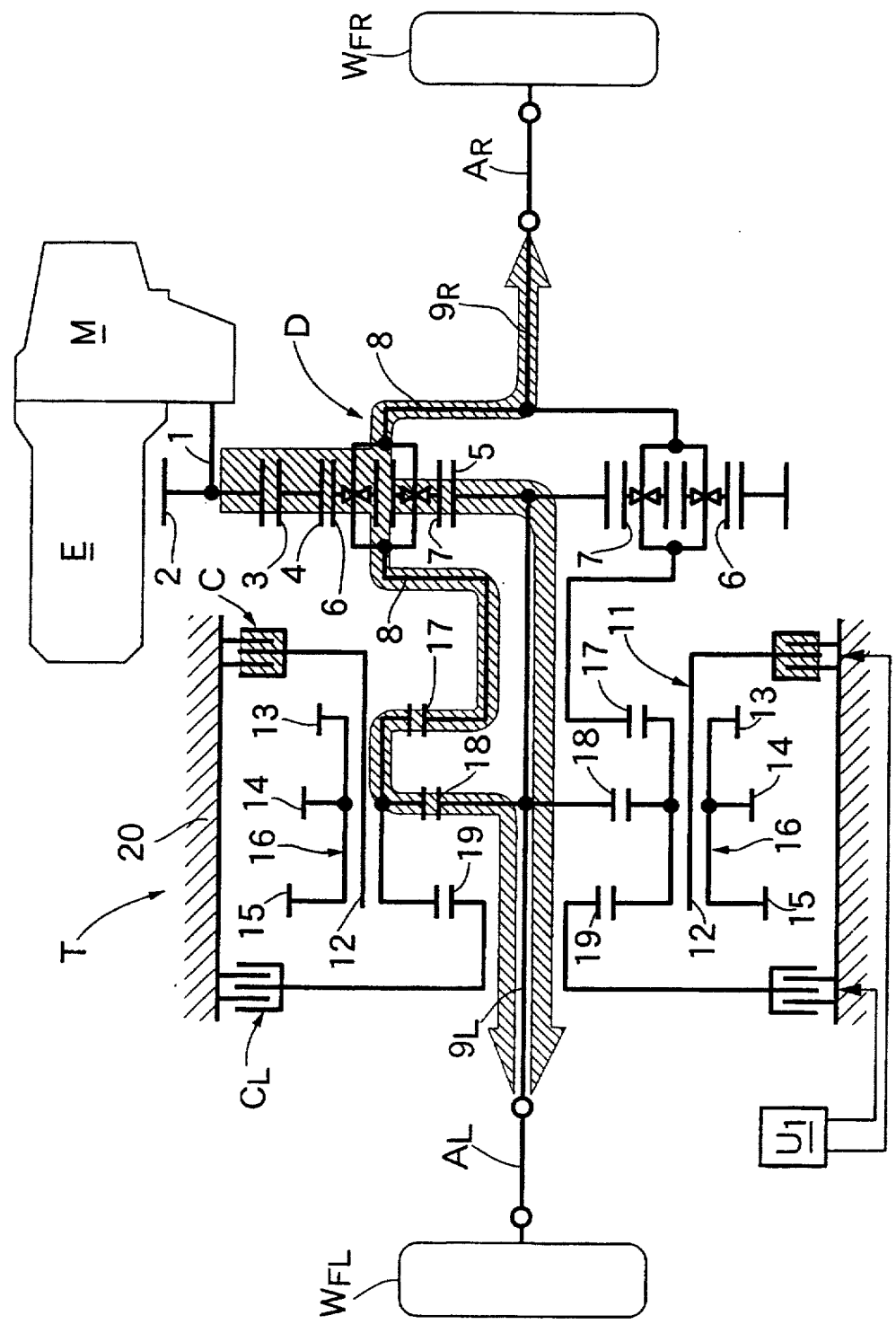
Figure 4:
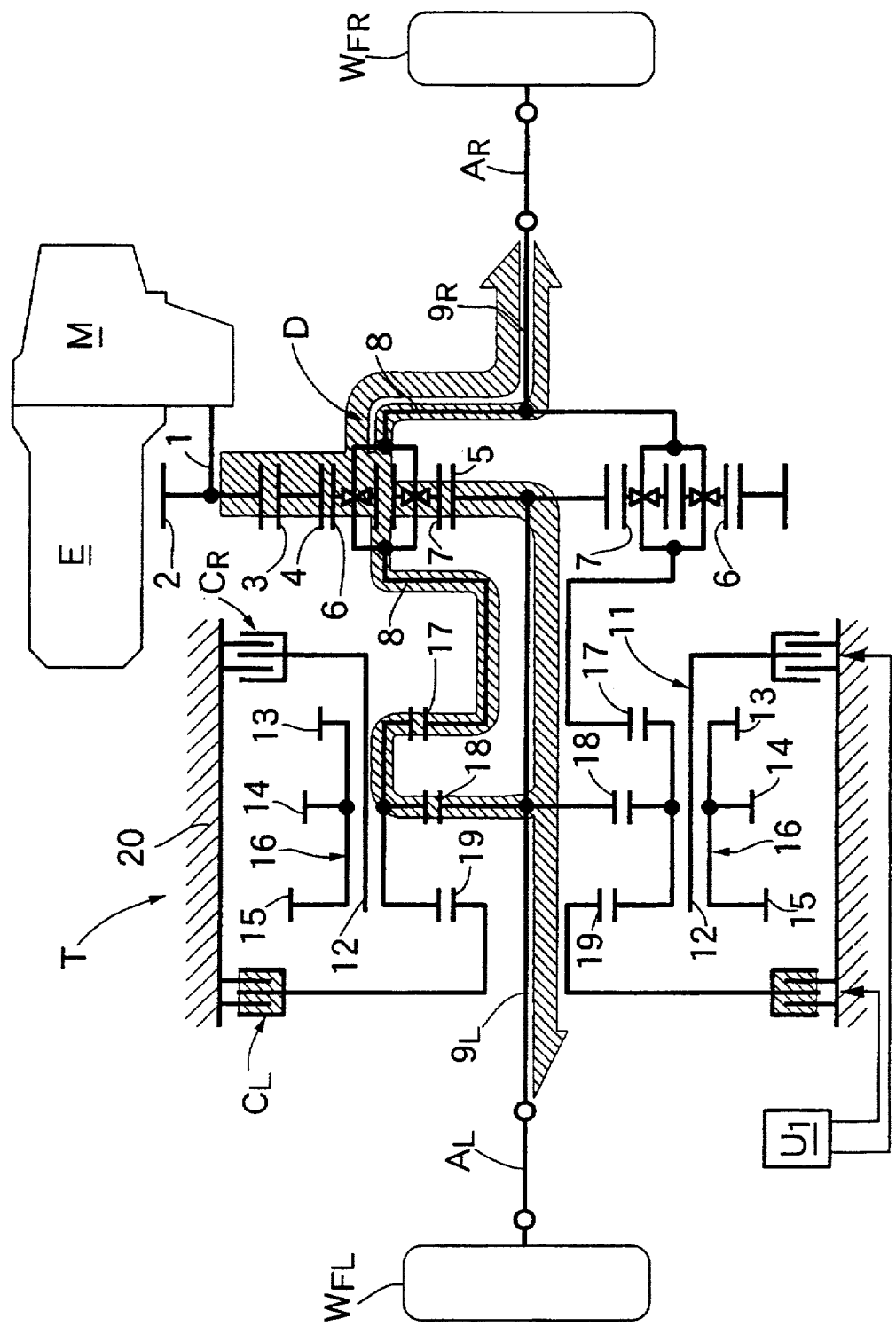
Figure 5:
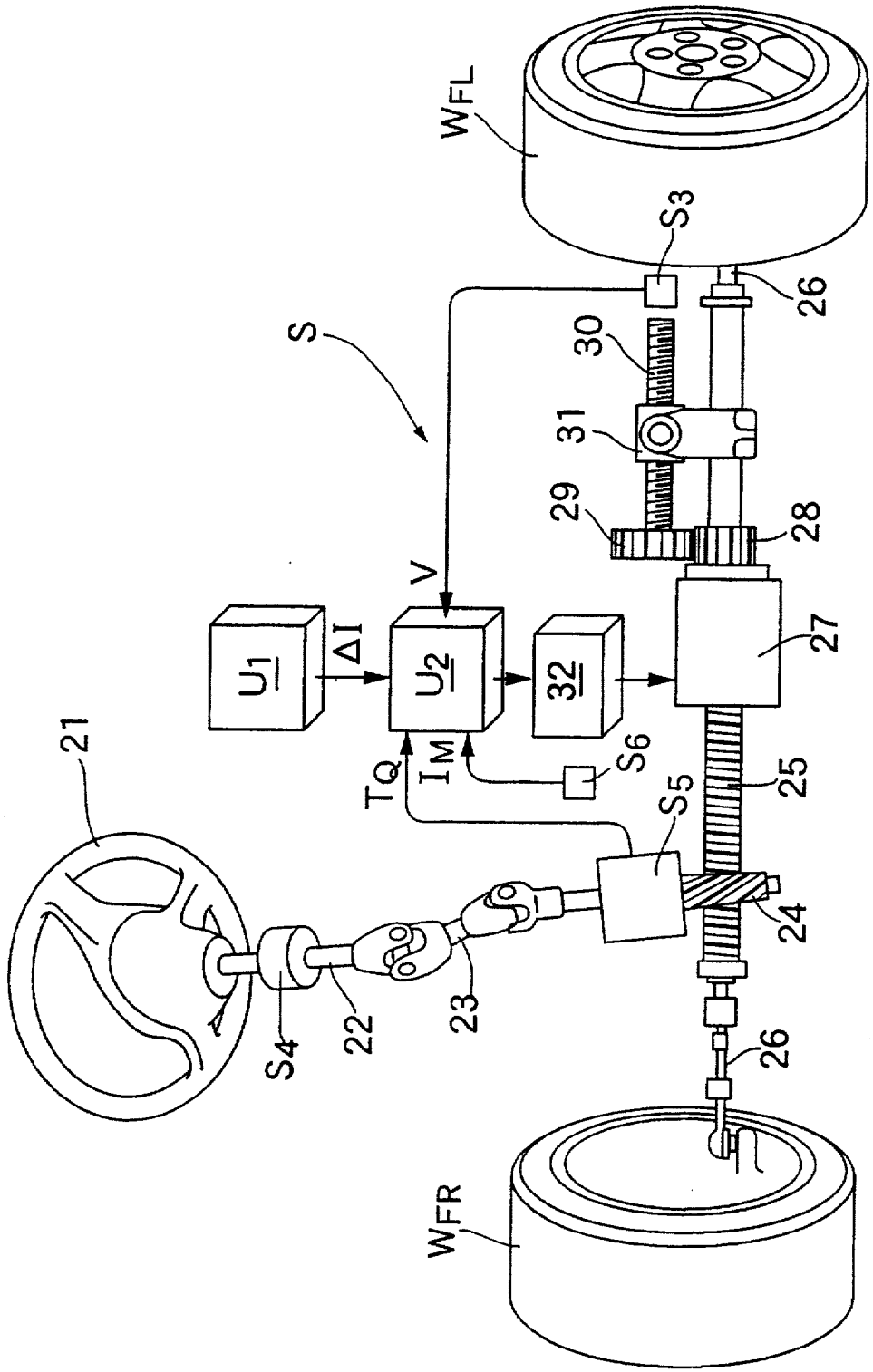
Figure 6:
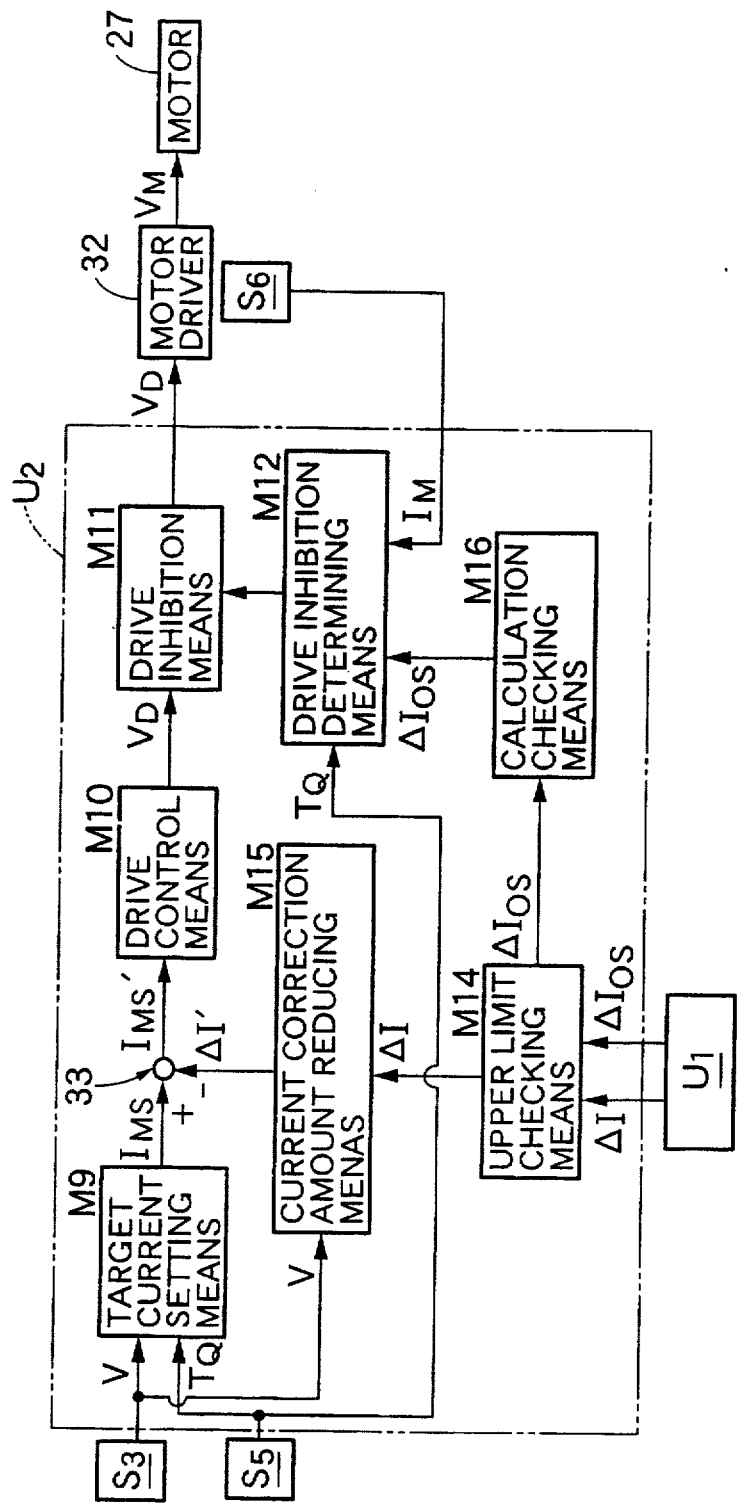
Figure 7:
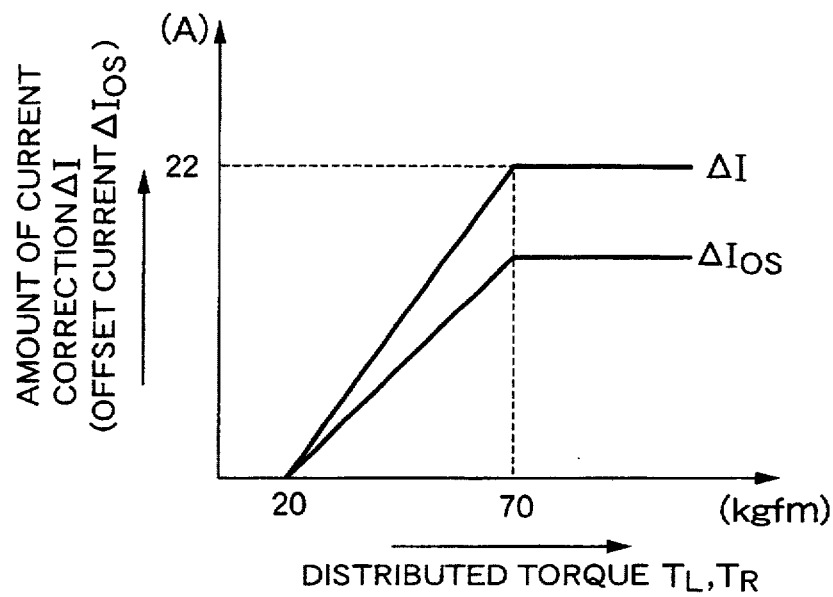
Figure 8:
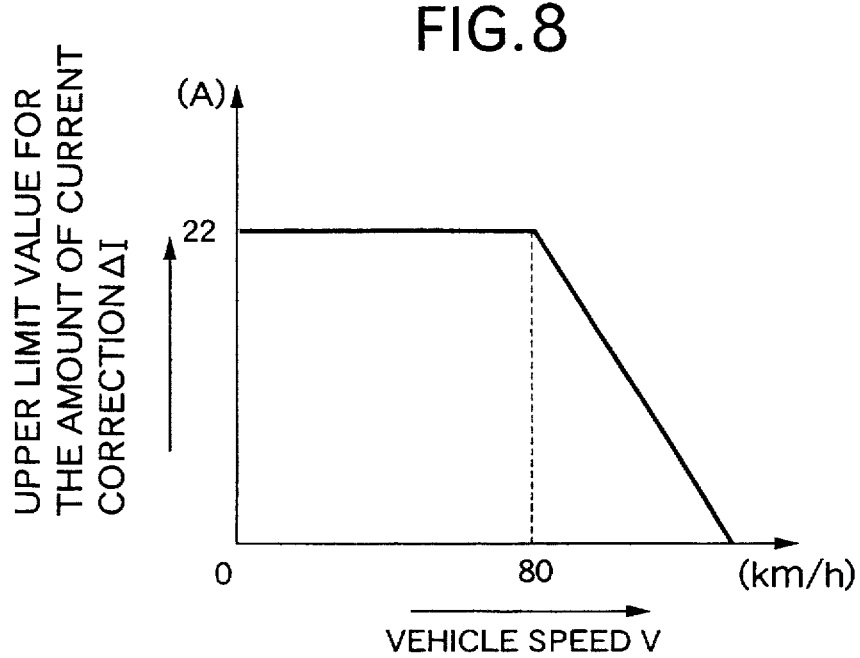
Figure 10:
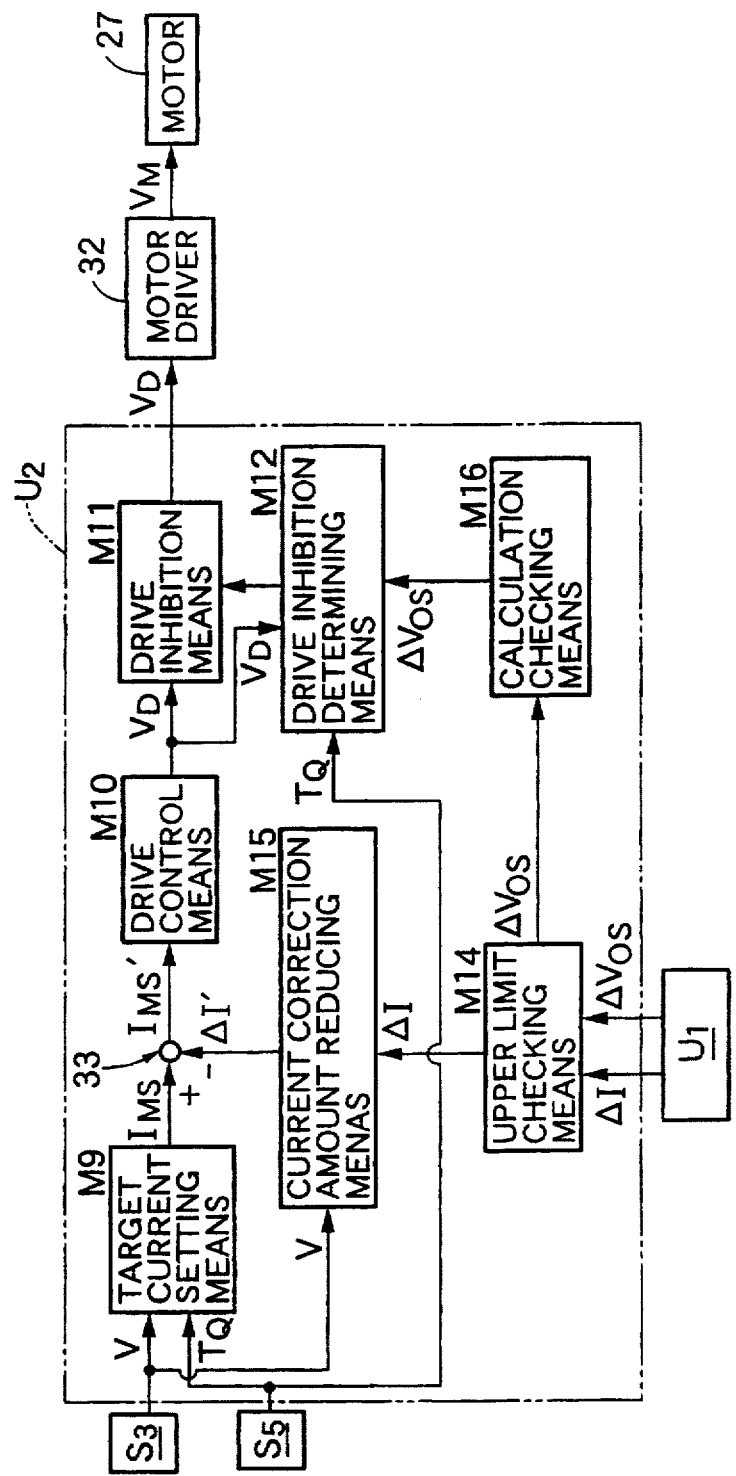
Figure 11:
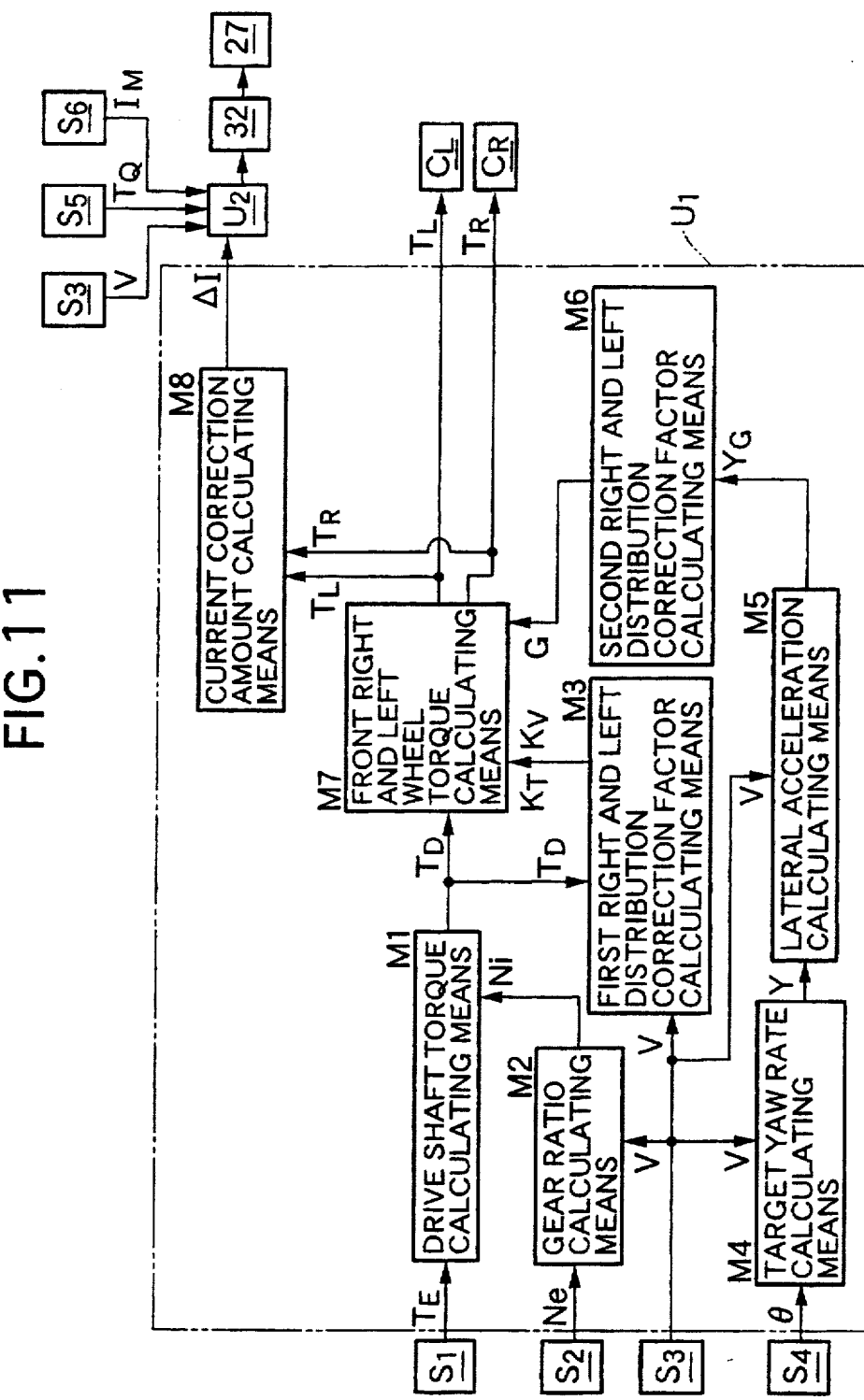
Figure 12:
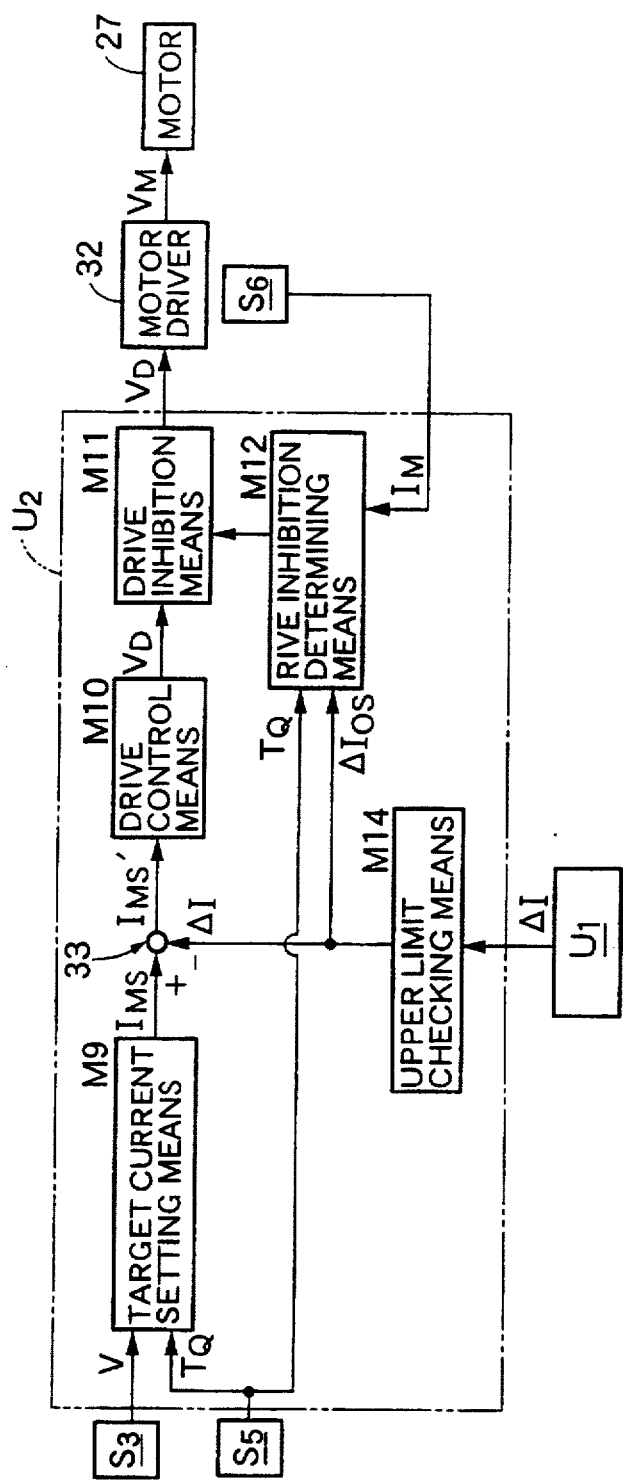
Figure 13:
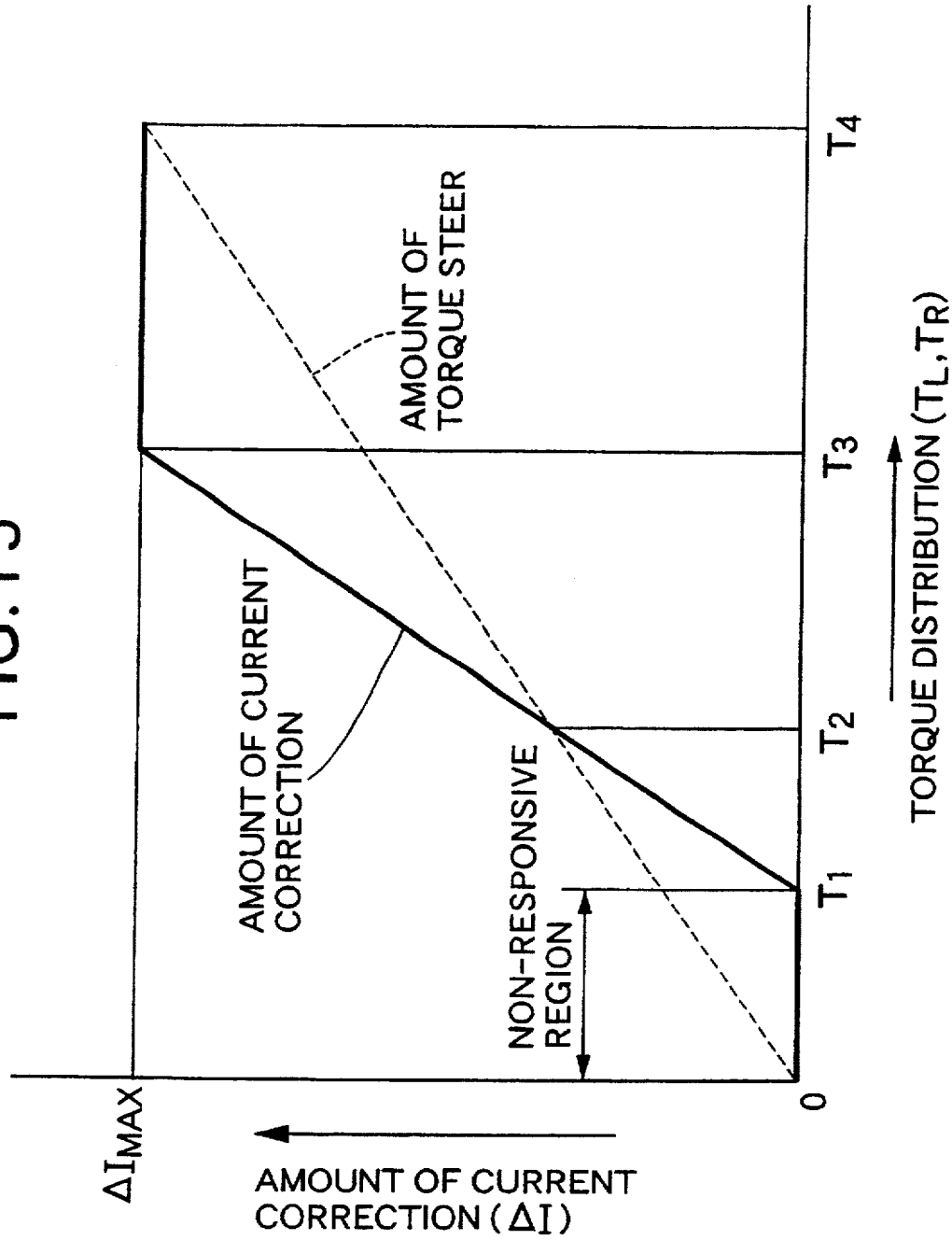

The broken line in FIG. 13 refers to the amount of torque steer, and this amount of torque steer is proportional to the torque distributions $T_R$, $T_L$. The amount of current correction $\Delta I$ shown by the solid line is not proportional to the torque distributions $T_R$, $T_L$, and the region in which the torque distributions $T_R$, $T_L$ are from 0 to $T_1$ is considered to be a non-responsive region and the amount of current correction $\Delta I$ is maintained at zero even when the torque distributions $T_R$, $T_L$, increase. The region in which the torque distributions $T_R$, $T_L$ are from $T_1$ to $T_3$ is a region in which the amount of current correction $\Delta I$ increases, the slope thereof is set so as to be larger than the slope for the amount of torque steer, and therefore the amount of current correction $\Delta I$ exceeds the amount of torque steer in the region in which the torque distributions $T_R$, $T_L$ are larger than $T_2$. The amount of torque steer at the point at which the torque distributions $T_R$, $T_L$ are $T_4$ is defined as the maximum value $\Delta I_{MAX}$ (e.g., 22 A) for the amount of current correction $\Delta I$, and in the region where the torque distributions $T_R$, $T_L$ are from $T_3$ to $T_4$ the amount of current correction $\Delta I$ is maintained at the aforementioned maximum value $\Delta I_{MAX}$.

Figure 12:
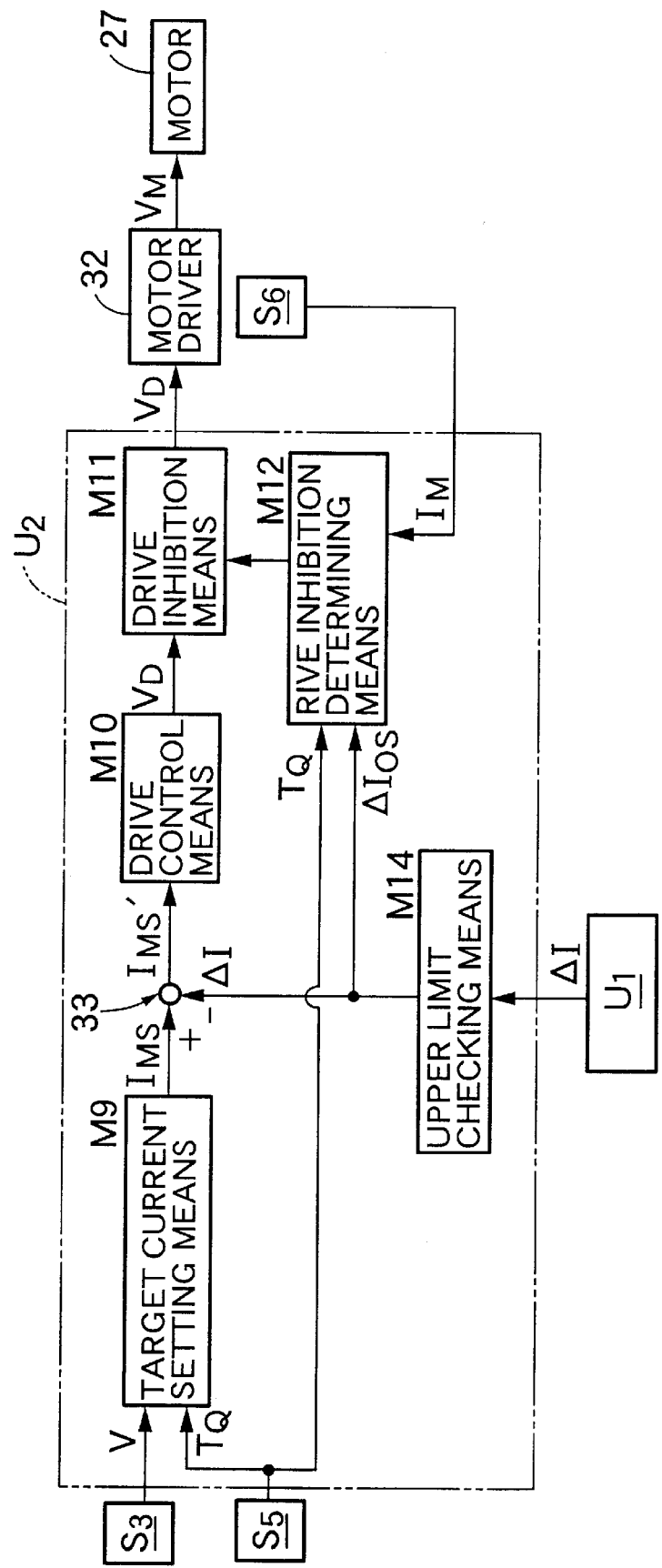

As is clear from a comparison of FIG. 12 with FIG. 6 (the first embodiment), the second electronic control unit $U_2$ shown in FIG. 12 comprises a target current setting means M9, a drive control means M10, a drive inhibition means M11, a drive inhibition determining means M12, an upper limit checking means M14 and a subtraction means 33, but it does not include the current correction amount reducing means M15 or the calculation checking means M16 of the first embodiment.

The upper limit checking means M14 checks that the amount of current correction $\Delta I$ input from the first electronic control unit $U_1$ is definitely not higher than 22 A.

The target current setting means M9 carries out a map look up for the target current $I_{MS}$ for driving the motor 27 of the electric power steering device S based on the vehicle speed V which is input from the vehicle speed detecting means $S_3$ and the steering torque $T_Q$ which is input from the steering torque detecting means $S_5$. The target current $I_{MS}$ is set so as to increase in response to an increase in the steering torque $T_Q$ and increase in response to a decrease in the vehicle speed V, and these characteristics allow a steering assist torque to be generated according to the travel state of the vehicle.

The target current $I_{MS}$ which is output from the target current setting means M9 and the amount of current correction $\Delta I$ which is output from the upper limit checking means M14 are input into the subtraction means 33, in which the amount of current correction $\Delta I$ is subtracted from the target current $I_{MS}$ so as to give a corrected target current $I_{MS}{'}$ ($=I_{MS}-\Delta I$). In the case where a steering force is applied due to the operation of the driving force distribution device T in the same direction as that of the steering operation of the driver, the corrected target current $I_{MS}{'}$ is calculated by subtracting the amount of current correction $\Delta I$ from the target current $I_{MS}$, but in the case where a steering force is applied in the opposite direction to that of the steering operation of the driver, the corrected target current $I_{MS}{'}$ may be calculated by adding the amount of current correction $\Delta I$ to the target current $I_{MS}$.

The drive control means M10 converts the corrected target current $I_{MS}{'}$ into a motor drive signal $V_D$ and outputs the motor drive signal $V_D$ to the drive inhibition means M11. When no drive inhibition signal is input from the drive inhibition determining means M12, the drive inhibition means M11 outputs the above-mentioned motor drive signal $V_D$ to the motor driver 32 so as to drive the motor 27 at a motor voltage $V_M$ and thus the electric power steering device S is made to generate a steering assist torque. By controlling the electric power steering device S based on the corrected target current $I_{MS}{'}$ calculated from the target current $I_{MS}$ and the amount of current correction $\Delta I$ it becomes possible to simultaneously lessen the torque steer phenomenon and assist the steering operation by the driver, which is the primary function of the electric power steering device S.

In the case where an abnormality such as a malfunction of the control system occurs, a drive inhibition signal is input from the drive inhibition determining means M12 into the drive inhibition means M11, the drive inhibition means M11 inhibits the output of the above-mentioned motor drive signal $V_D$ and the operation of the electric power steering device S, and thus the electric power steering device S is prevented from generating a steering assist torque which is not anticipated by the driver.

An actual motor current $I_M$ which is detected by a current detecting means $S_6$ and supplied to the motor 27, a steering torque $T_Q$ detected by a steering torque detecting means $S_5$ and an offset current $\Delta I_{OS}$ which is output from the upper limit checking means M14 are input into the drive inhibition determining means M12. In the present embodiment, the offset current $\Delta I_{OS}$ is the same as the amount of current correction $\Delta I$ ($\Delta I = \Delta I_{OS}$). The drive inhibition determining means M12 determines whether or not the drive of the electric power steering device S is inhibited by inputting the actual motor current $I_M$ and the steering torque $T_Q$ to a map which has been corrected on the basis of the offset current $\Delta I_{OS}$.

FIG. 9A is, again, a map of the art for carrying out the above-mentioned determination, and this map was originally prepared for a vehicle not containing a driving force distribution device T, that is to say, a vehicle in which co-operative control of an electric power steering device S and a driving force distribution device T was not carried out. When the steering torque $T_Q$ and the actual motor current $I_M$ are in the hatched assists inhibition regions, the drive inhibition determining means M12 outputs a command to inhibit the drive of the motor 27 to the drive inhibition means M11.

Again, however, because the above-mentioned explanation applies to a vehicle without co-operative control of the electric power steering device S and the driving force distribution device T, if the map in FIG. 9A in which the current component for lessening the torque steer phenomenon is not considered is used as it is, there is a possibility that an erroneous determination might be made and the operation of the electric power steering device S might be inhibited when its operation is necessary or the operation of the electric power steering device S might be permitted when its operation is unnecessary.

In the present embodiment, and again in with reference to FIG. 9B, in order to avoid the above-mentioned situation, the assist inhibition area may be shifted upwards in the ordinate direction by an amount corresponding to the amount of current correction $\Delta I$ (that is to say, the offset current $\Delta I_{OS}$). By so doing it is possible to cause an amount of steering torque, in the direction opposite to that of the steering direction, corresponding to the amount of current correction $\Delta I$ in the electric power steering device S and thus cancel the torque steer phenomenon accompanying the operation of the driving force distribution device T.

As was explained for FIG. 13, since the region in which the torque distributions $T_R$, $T_L$ are from 0 to $T_1$ is a non-responsive region and the amount of current correction $\Delta I$ is maintained at zero, the electric power steering device S does not generate a steering assist torque for counteracting the torque steer phenomenon in this region. Therefore, in a case where the torque distributions $T_R$, $T_L$ are erroneously estimated in the region in which the torque distributions $T_R$, $T_L$ are small, the electric power steering device S is prevented from generating an inadequate steering assist torque due to an erroneous estimation which would give a disagreeable sensation to the driver.

As described above, when the region in which the torque distributions $T_R$, $T_L$ are small is set as a non-responsive region, although the rise of the amount of current correction $\Delta I$ is delayed, the amount of current correction $\Delta I$ is set so as to have a large slope in the subsequent region in which the torque distributions $T_R$, $T_L$ are from $T_1$ to $T_3$. Thus an amount of current correction $\Delta I$ which exceeds the amount of torque steer is output in the region in which the torque distributions $T_R$, $T_L$ are from $T_2$ to $T_4$, and this therefore compensates for the aforementioned delay in the rise of the amount of current correction $\Delta I$, whereby sufficient steering assist torque is generated and the torque steer phenomenon can effectively be lessened. Moreover, since the maximum value $\Delta I_{MAX}$ is maintained after the point at which the amount of current correction $\Delta I$ reaches the maximum value $\Delta I_{MAX}$, i.e., where the torque distributions $T_R$, $T_L$ are $T_3$, it is possible to prevent the electric power steering device S from generating an excess steering assist torque.

Embodiments of the present invention have been described in detail above, but the present invention can be modified in a variety of ways without departing from the spirit and scope of the invention, as set forth in the appended claims.

For example, the driving force distribution device in the present invention is not limited to one in which the driving force is distributed between the right and the left wheels, but may be one in which the driving force is distributed between the front and the rear wheels. Furthermore, the present invention can also be applied in cases where the braking force is distributed between the right and the left wheels or the front and the rear wheels, or in which both driving force and braking force are distributed between the right and left wheels or the front and rear wheels.

What is claimed is:

1. A co-operative control system for a vehicle having a force distribution device for distributing at least one of a driving force and a braking force between spaced apart wheels, the co-operative system comprising: a first control means for controlling operation of the force distribution device; an electric power steering device having a motor for applying a steering assist torque to a steering system of the vehicle; and a second control means for calculating a motor control signal for driving the motor based on at least a steering torque signal detected by a steering torque detecting means, and for inhibiting drive of the motor based on at least an actual motor current signal detected by a current detecting means and the steering torque signal, wherein:

the first control means calculates a correction signal for correcting said motor control signal based on the amount of control of the force distribution device and an offset current for correcting the actual motor current signal; and the second control means drives the motor based on a corrected motor control signal obtained by correcting the motor control signal with the correction signal and inhibits the drive of the motor based on a value obtained by correcting the actual motor current signal with the offset current and the steering torque signal, said offset current being set smaller than said correction signal.

2. A co-operative control system for a vehicle having a force distribution device for distributing at least one of a driving force and a braking force between spaced apart wheels, the co-operative control system comprising: a first control means for controlling operation of the force distribution device; an electric power steering device having a motor for applying a steering assist torque to a steering system of the vehicle; and a second control means for calculating a motor control signal for driving the motor based on at least a steering torque signal detected by a steering torque detecting means, and for inhibiting drive of the motor based on at least a motor drive signal calculated based on the motor control signal and the steering torque signal, wherein:

the first control means calculates a correction signal for correcting said motor control signal based on an amount of control of the force distribution device and an offset signal for correcting the motor drive signal; the second control means drives the motor based on a corrected motor control signal obtained by correcting the motor control signal with the correction signal, and inhibits the drive of the motor based on a value obtained by correcting the motor drive signal with the offset signal and the steering torque signal; and said offset signal being set smaller than a value obtained by converting said correction signal into an amount of motor drive.

* * * * *

UNITED STATES PATENT AND TRADEMARK OFFICE
CERTIFICATE OF CORRECTION

PATENT NO. : 6,295,496 B1
DATED : September 25, 2001
INVENTOR(S) : Tomoyuki Shinmura; Hiromi Inagaki; Masakatsu Hori; Tatsuhiro Tomari; Shinji Okuma; Akihiro Iwazaki; Takashi Kuribayashi; Kazuhiro Wada It is certified that error appears in the above-identified patent and that said Letters Patent is hereby corrected as shown below:

Change Figures 1-8 with the attached Figures 1-8

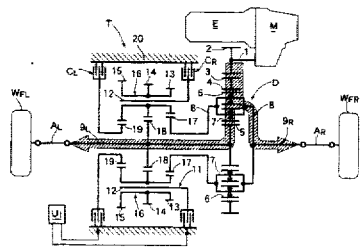

Signed and Sealed this

Nineteenth Day of February, 2002

Attest:

JAMES E. ROGAN
Attesting Officer
Director of the United States Patent and Trademark Office

United States Patent
Shinmura et al.

(10) Patent No.: US 6,295,496 B1
(45) Date of Patent: Sep. 25, 2001

(54) CO-OPERATIVE CONTROL SYSTEM FOR A VEHICLE

(75) Inventors: Tomoyuki Shinmura; Hiromi Inagaki; Masakatsu Hori; Tatsuhiro Tomari; Shinji Okuma; Akihiro Iwazaki; Takashi Kuribayashi; Kazuhiro Wada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,272

(22) Filed: Sep. 1, 2000

(30) Foreign Application Priority Data

Sep. 7, 1999 (JP) ................................. 11-253035

(51) Int. Cl.⁷ ................................................ G06F 15/20
(52) U.S. Cl. ........................ 701/48; 701/69; 701/41; 180/446
(58) Field of Search ........................... 701/36, 41, 48, 701/69; 180/443, 446

(56) References Cited

U.S. PATENT DOCUMENTS 5,189,617 * 2/1993 Shiraishi .............................. 701/48
5,369,581 * 11/1994 Ohsuga et al. .......................... 701/111

FOREIGN PATENT DOCUMENTS 11129927 5/1999 (JP) .

* cited by examiner

Primary Examiner—William A. Cuchlinski, Jr.
Assistant Examiner—Marthe Y. Marc-Coleman
(74) Attorney, Agent, or Firm—Carrier, Blackman & Associates, P.C.; Joseph P. Carrier; William D. Blackman

(57) ABSTRACT

A co-operative control system for a vehicle having a force distribution device for distributing at least one of a driving force and a braking force between spaced apart wheels, the co-operative system having: a first control mechanism for controlling the operation of the force distribution device, an electric power steering device having a motor for applying a steering assist torque to a steering system of the vehicle, and a second control mechanism for calculating a motor control signal for driving the motor based on at least a steering torque detected by a steering torque sensor, and for inhibiting drive of the motor based on at least an actual motor detected by a current sensor and the steering torque. The first control mechanism calculates a correction signal for correcting the motor control signal based on the amount of control of the force distribution device and an offset current for correcting the actual motor current signal; and the second control mechanism drives the motor based on a corrected motor control signal obtained by correcting the motor control signal with the correction signal and inhibits the drive of the motor based on a value obtained by correcting the actual motor current signal with the offset current and the steering torque signal, the offset current being set smaller than the correction signal.

2 Claims, 13 Drawing Sheets

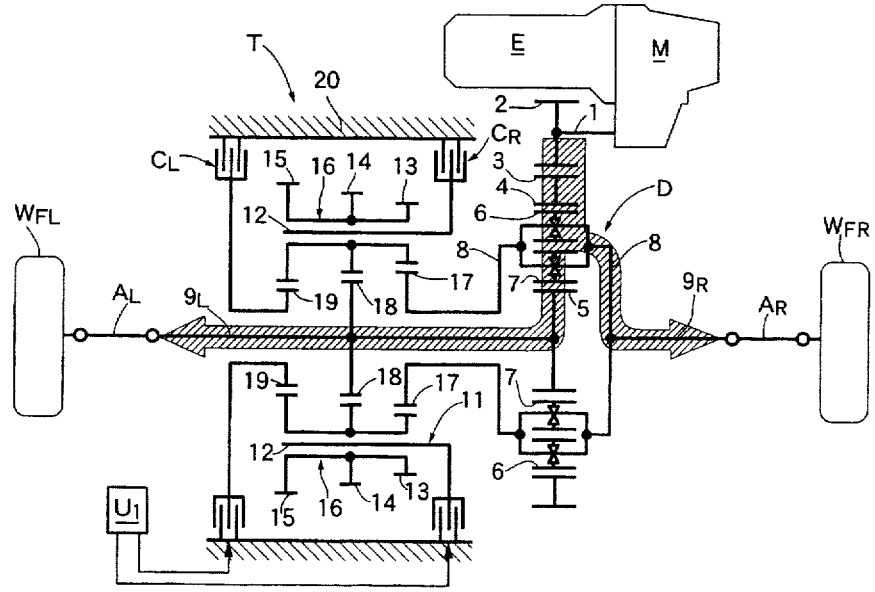

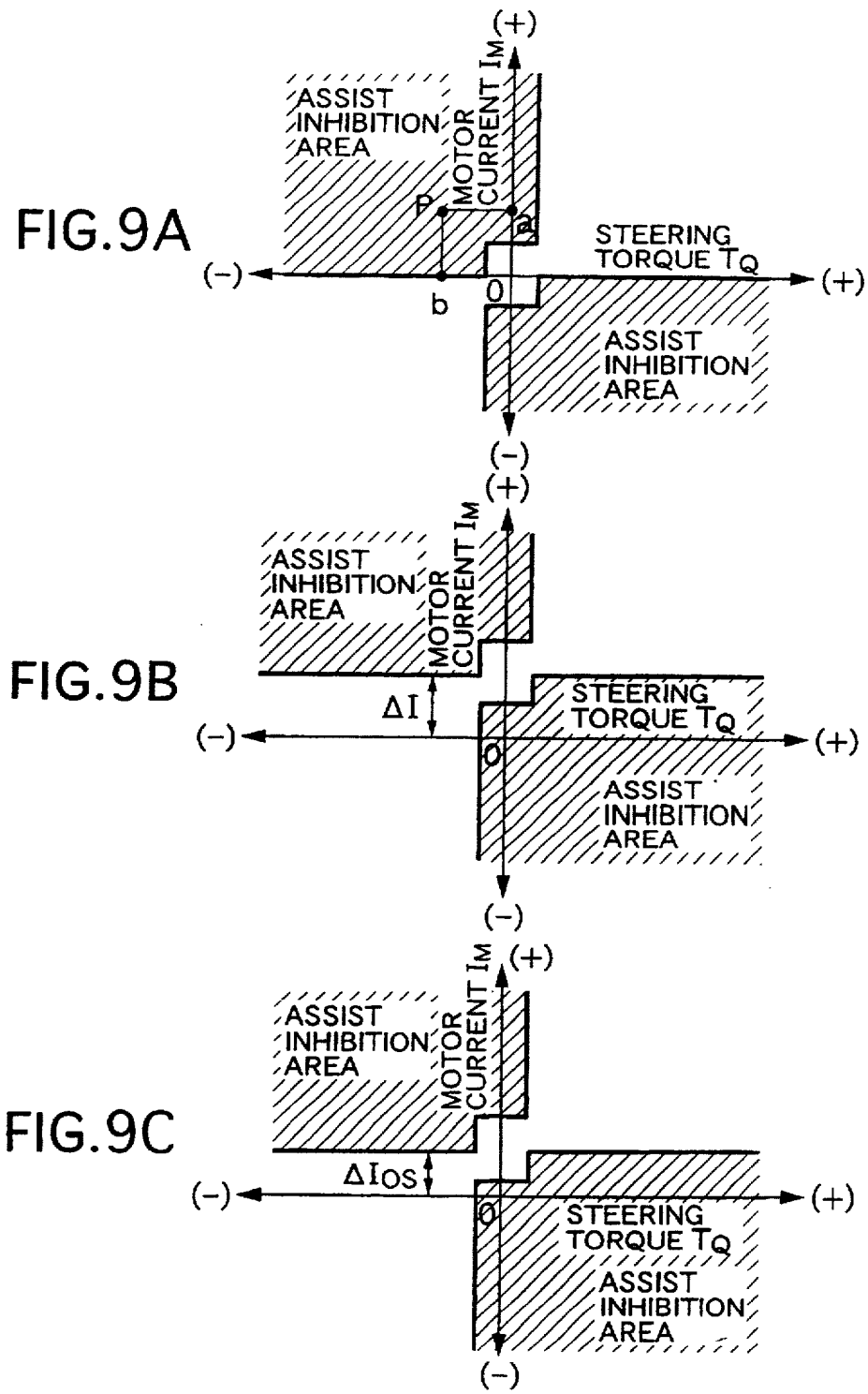

CO-OPERATIVE CONTROL SYSTEM FOR A VEHICLE

BACKGROUND OF THE INVENTION

1. Field of the Invention

The present invention relates to co-operative control systems for vehicles comprising a combination of a driving force or braking force distribution device which distributes the driving force or braking force between the right and left wheels or between the front and rear wheels and an electric power steering device which applies a steering assist torque to a steering system.

2. Description of the Relevant Art

There is a known technique for enhancing turning performance of a vehicle where the ratio by which the engine driving force is distributed between the right and left driven wheels is made variable, and the driving force distributed to the outer turning wheel is increased while the driving force distributed to the inner turning wheel is decreased so as to generate a yaw moment in the turning direction. In a vehicle having such a driving force distribution device, there is a disadvantage that when the driving forces distributed to the right and left driven wheels are varied, an undesirable steering force is produced in the right and left driven wheels which also serve as steered wheels (the torque steer phenomenon). Therefore, the present assignee has already made a proposal in which the torque steer phenomenon is lessened by utilizing an electric power steering device, which is provided in a vehicle and generates a steering assist torque in the electric power steering device so as to counteract the above-mentioned undesirable steering force (ref. Japanese Patent Application No. 9-302155).

Also, the present assignee has already made a proposal in which, with regard to a vehicle having an electric power steering device and in order to prevent an undesirable steering assist torque from being generated by an abnormality in the control means for the electric power steering device, when the actual motor current running in the motor of the electric power steering device and the steering torque detected by the steering torque detecting means are in a predetermined assist inhibition area, the drive of the motor of the electric power steering device is inhibited (ref. Japanese Patent Application No. 10-370099).

In the case where the vehicle has both of the previously proposed driving force distribution device and electric power steering device, the actual motor current of the electric power steering device includes a current component for assisting the steering operation of the driver and a current component for lessening the torque steer phenomenon. Therefore, if the value for the aforementioned assist inhibition area is looked up on the basis of the actual motor current, there is a possibility that, under the influence of the current component for lessening the torque steer phenomenon, the operation of the electric power steering device could be inhibited when its operation is necessary or the operation of the electric power steering device could be permitted when its operation is unnecessary.

The present assignee has, however, already made another proposal in which, with regard to a vehicle carrying out co-operative control of a driving force distribution device and an electric power steering device, the torque steer phenomenon can be effectively reduced by changing the aforementioned assist inhibition area according to the value of the current component for lessening the torque steer phenomenon so as to make the electric power steering device generate a steering torque in the opposite direction to that for assisting the steering operation (ref. Japanese Patent Application No. 11-63114).

When a vehicle carrying out co-operative control of a driving force distribution device and an electric power steering device travels in a straight line, both the current component for assisting the steering operation and the current component for lessening the torque steer phenomenon become zero. However, in the case where a current component for lessening the torque steer phenomenon is output due to a malfunction of the control means when the vehicle is travelling in a straight line and the torque steer phenomenon is not occurring, since the above-mentioned proposal described in Japanese Patent Application No. 11-63114 does not inhibit the output of the current component for lessening the torque steer phenomenon by using an assist inhibition area, an unexpected steering assist torque is produced and there is a possibility that the driver might experience a disagreeable sensation.

SUMMARY OF THE INVENTION

The present invention has been carried out in view of the above-mentioned circumstances, and it is an objective of the present invention to prevent the electric power steering device from generating a steering assist torque which gives a disagreeable sensation to the driver when the control means malfunctions in a co-operative control system for a vehicle which reduces the torque steer phenomenon by co-operatively controlling a driving force or braking force distribution device and an electric power steering device.

In order to achieve such objective, in accordance with a first characteristic of the present invention, a co-operative control system for a vehicle is proposed, with regard to a vehicle comprising force distribution device for distributing the driving force or braking force between spaced apart wheels, the vehicle co-operative control system comprising: a first control means for controlling the operation of the force distribution device; an electric power steering device having a motor for applying a steering assist torque to the vehicle steering system; and a second control means for calculating a motor control signal for driving the motor based on at least a steering torque signal detected by a steering torque detecting means and for inhibiting drive of the motor based on at least an actual motor current signal detected by a current detecting means and the steering torque signal; wherein the first control means calculates a correction signal for correcting the motor control signal based on an amount of control of the force distribution device and an offset current for correcting the actual motor current signal, and the second control means drives the motor based on a corrected motor control signal obtained by correcting the motor control signal with the correction signal and inhibits the drive of the motor based on a value obtained by correcting the actual motor current signal with the offset current and the steering torque signal, the offset current being set so as to be smaller than the correction signal.

In accordance with such co-operative control system for a vehicle, since a corrected motor control signal is calculated by correcting a motor control signal calculated by the second control means of the electric power steering device with a correction signal calculated by the first control means based on the amount of control of the force distribution device, and the second control means drives the motor of the electric power steering device based on the corrected motor control signal, it is possible to simultaneously assist the steering operation of the driver and lessen the torque steer phenomenon. Moreover, since the offset current for correcting the actual motor current signal is set so as to be smaller than the correction signal, when it is determined that the drive of the motor should be inhibited, if the first control means malfunctions so outputting an inadequate correction signal, it is possible to effectively inhibit the drive of the motor and prevent the electric power steering device from generating a steering assist torque which would give the driver a disagreeable sensation.

In accordance with a second characteristic of the present invention, in addition to the first characteristic described above, a co-operative control system for a vehicle is proposed, with regard to a vehicle having a force distribution device for distributing the driving force or braking force between spaced apart wheels, the co-operative control system comprising: a first control means for controlling the operation of the force distribution device; an electric power steering device having a motor for applying a steering assist torque to the vehicle steering system; and a second control means for calculating a motor control signal for driving the motor based on at least a steering torque signal detected by a steering torque detecting means, and for inhibiting drive of the motor based on at least a motor drive signal calculated based on the motor control signal and the steering torque signal; wherein the first control means calculates a correction signal for correcting the motor control signal based on an amount of control of the force distribution device and an offset signal for correcting the motor drive signal; and the second control means drives the motor based on a corrected motor control signal obtained by correcting the motor control signal with the correction signal and inhibits the drive of the motor based on a value obtained by correcting the motor drive signal with the offset signal and the steering torque signal, the offset signal being set smaller than a value obtained by converting the correction signal into an amount of motor drive.

In accordance with such control co-operative control system for a vehicle, again, since a corrected motor control signal is calculated by correcting a motor control signal calculated by the second control means of the electric power steering device with a correction signal calculated by the first control means based on the amount of control of the force distribution device, and the second control means drives the motor of the electric power steering device based on the corrected motor control signal, it is possible to simultaneously assist the steering operation of the driver and lessen the torque steer phenomenon. Moreover, since the offset signal for correcting the motor drive signal (obtained by converting the corrected motor control signal into the amount of drive of the motor) is set so as to be smaller than the value obtained by converting the correction signal into the amount of drive of the motor when it is determined that the drive of the motor should be inhibited, if the first control means malfunctions so outputting an inadequate correction signal, it is possible to effectively inhibit the drive of the motor and prevent the electric power steering device from generating a steering assist torque which would give the driver a disagreeable sensation.

In the embodiments of the present invention: a target current $I_{MS}$ corresponds to the motor control signal, corrected target current $I_{M_s}'$ corresponds to the corrected motor control signal, the amount of current correction $\Delta I$ corresponds to the correction signal, a driving force distribution device T corresponds to the force distribution device, a first electronic control unit $U_1$ corresponds to the first control means and a second electronic control unit $U_2$ corresponds to the second control means.

The above-mentioned objectives, as well as other objectives, characteristics and advantages of the present invention will become apparent from an explanation of presently preferred embodiments which will be described in detail below by reference to the attached drawings.

BRIEF DESCRIPTION OF THE DRAWINGS

FIGS. 1 to 9 illustrate a first embodiment of the present invention.

FIG. 1 is a schematic diagram showing the structure of the overall driving force distribution device of the embodiment.

FIG. 2 is a block diagram showing the configuration of the circuit of the first electronic control unit in FIG. 1.

FIG. 3 is a schematic diagram showing the action of the driving force distribution device of FIG. 1 when the vehicle is turning right at a medium to low speed.

FIG. 4 is a schematic diagram showing the action of the driving force distribution device of FIG. 1 when the vehicle is turning left at a medium to low speed.

FIG. 5 is a sketch showing the structure of the electric power steering device of the embodiment.

FIG. 6 is a block diagram showing the configuration of the circuit of the second electronic control unit in FIG. 1.

FIG. 7 is a map or graph for looking up the amount of current correction or the offset current from the torque distribution.

Figure 8:
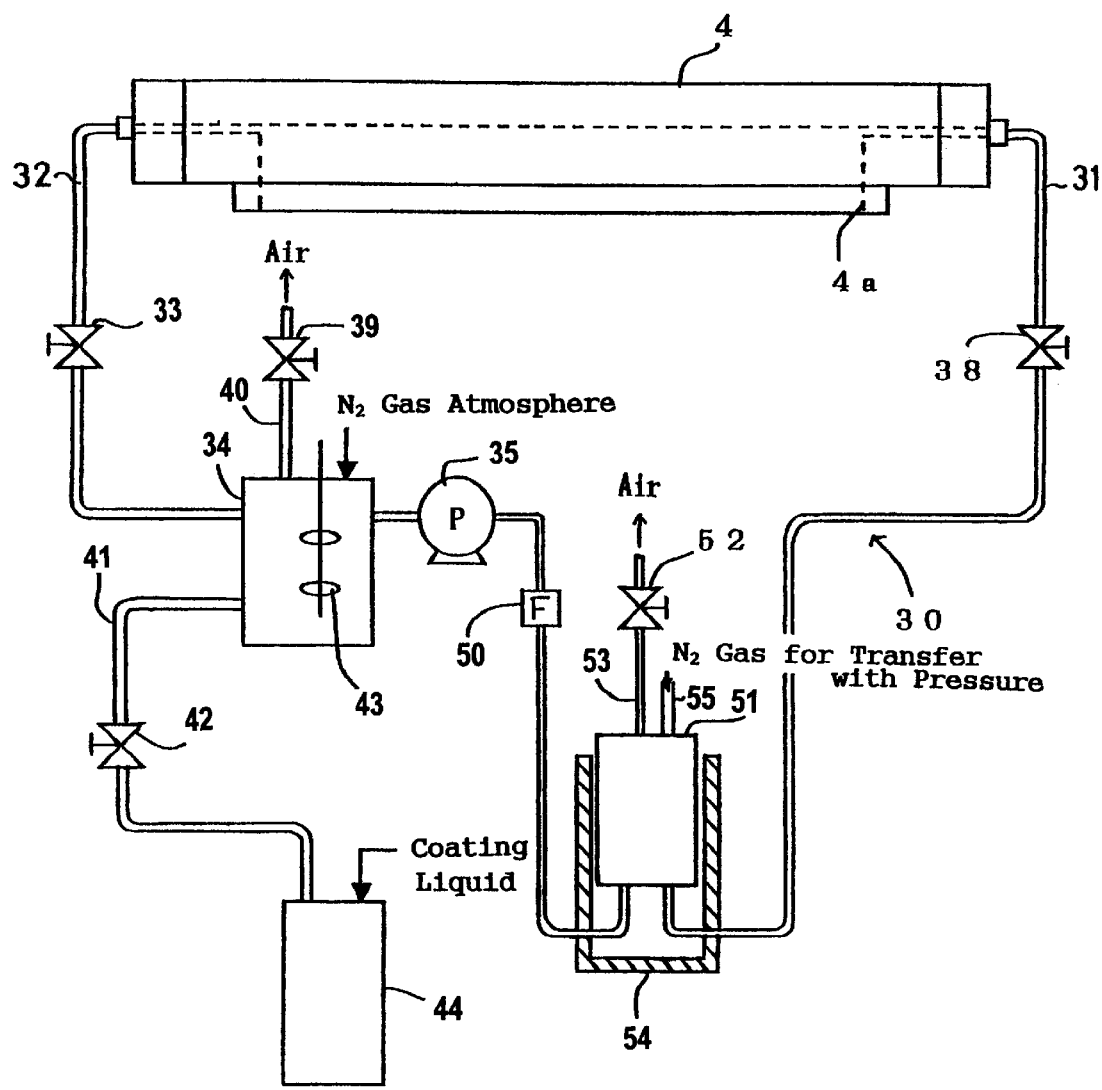

FIG. 8 is a map or graph for looking up the upper limit for the amount of current correction from the vehicle speed.

FIG. 9A to FIG. 9C are maps or graphs for looking up the area in which the operation of the electric power steering device is inhibited.

Figure 10:
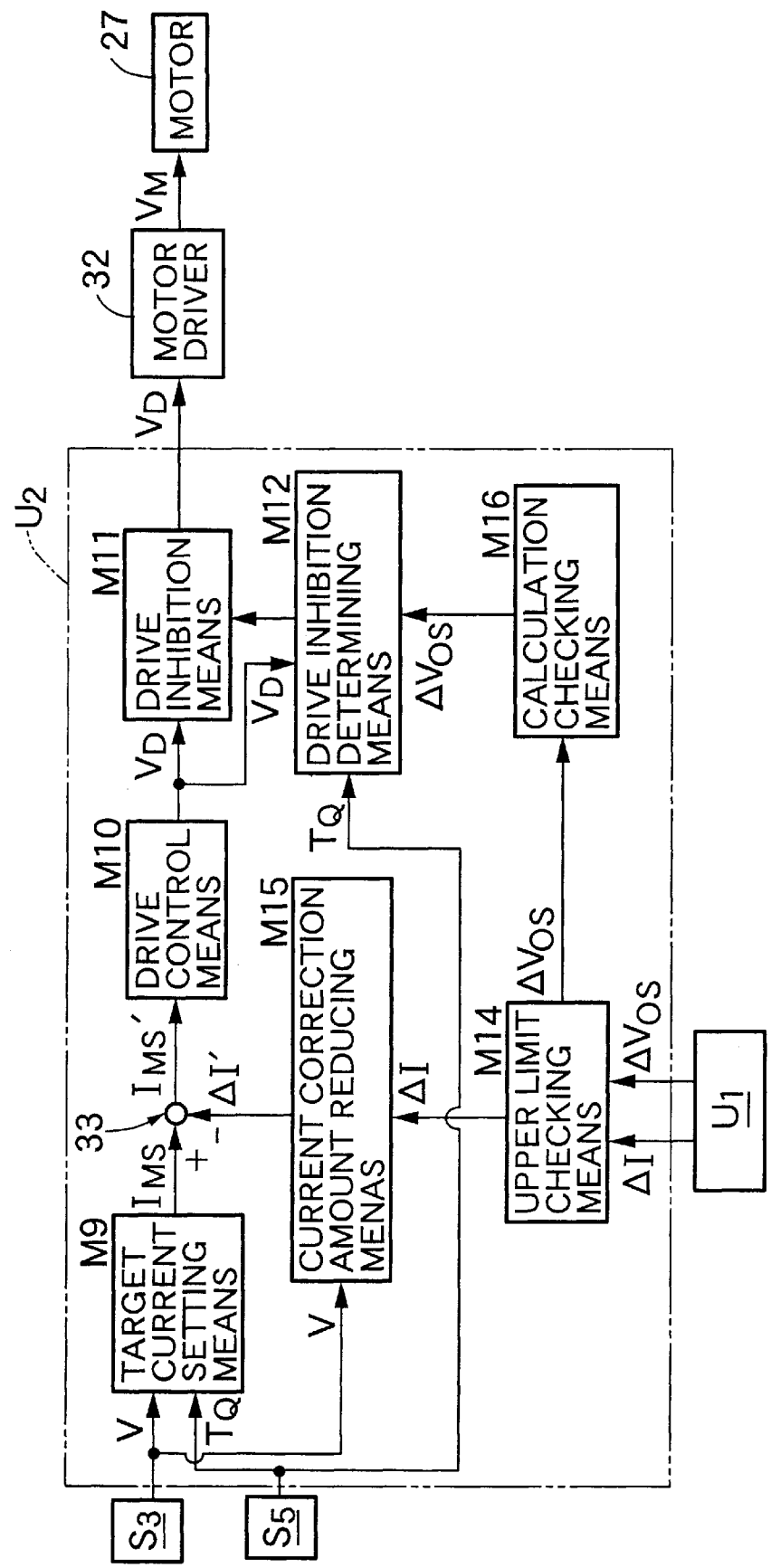
FIG. 10 is a schematic block diagram showing the configuration of the circuit of the second electronic control unit according to a second embodiment of the present invention.

FIG. 10 is a schematic block diagram showing the configuration of the circuit of the second electronic control unit according to a second embodiment of the present invention.

FIG. 11 to FIG. 13 illustrate techniques related to the present invention.

FIG. 11 is a block diagram showing the configuration of a modified circuit of the first electronic control unit similar to FIG. 2.

FIG. 12 is a block diagram showing the configuration of a modified circuit of the second electronic control unit similar to FIG. 6.

FIG. 13 is a map or graph for looking up the amount of current correction or the offset current from the torque distribution.

DETAILED DESCRIPTION OF PREFERRED EMBODIMENTS

As shown in FIG. 1, a transmission M is connected to the right end of an engine E which is laterally mounted in the front part of the vehicle body of a front-engine/front-wheel drive vehicle, and a driving force distribution device T is placed to the rear of engine E and transmission M. A front right wheel $W_{FR}$ and a front left wheel $W_{FL}$ are connected to a right drive shaft $A_R$ and a left drive shaft $A_L$, respectively, which extend laterally from the right end and the left end of the driving force distribution device T.

The driving force distribution device T comprises a differential D to which the driving force is transmitted from an outer toothed gear 3 meshing with an input gear 2 provided on an input shaft 1 extending from the transmission M. The differential D employs a double pinion type planetary gear mechanism and comprises a ring gear 4 which is integrally formed with the above-mentioned outer toothed gear 3, a sun gear 5 which is provided coaxially inside the ring gear 4, and a planetary carrier 8 which supports an outer planetary gear 6 meshing with the above-mentioned ring gear 4 and an inner planetary gear 7 meshing with the above-mentioned sun gear 5, in a state in which they are meshed with each other. In the differential D the ring gear 4 functions as an input element while the sun gear 5, which functions as one of the output elements is connected to the front left wheel $W_{FL}$ via a left output shaft $9_L$. The planetary carrier 8 which functions as the other of the output elements, is connected to the front right wheel $W_{FR}$ via a right output shaft $9_R$.

A carrier member 11 which is supported on the outer circumference of the left output shaft $9_L$ in a rotatable manner comprises four pinion shafts 12 provided in the circumferential direction at 90° intervals, and each pinion shaft 12 supports in a rotatable manner a triad pinion member 16 in which a first pinion 13, a second pinion 14 and a third pinion 15 are integrally formed.

A first sun gear 17 meshing with the above-mentioned first pinion 13, which is supported in rotatable manner on the outer circumference of the left output shaft $9_L$, is linked to the planetary carrier 8 of the differential D. A second sun gear 18 which is fixed on the outer circumference of the left output shaft $9_L$ meshes with the above-mentioned second pinion 14. Furthermore, a third sun gear 19 which is supported in a rotatable manner on the outer circumference of the left output shaft $9_L$ meshes with the above-mentioned third pinion 15.

The numbers of teeth of the first pinion 13, the second pinion 14, the third pinion 15, the first sun gear 17, the second sun gear 18 and the third sun gear 19 in the embodiment are as follows.

| | |
|---|---|
| Number of teeth of the first pinion 13 | $Z_2 = 17$ |
| Number of teeth of the second pinion 14 | $Z_4 = 17$ |
| Number of teeth of the third pinion 15 | $Z_6 = 34$ |
| Number of teeth of the first sun gear 17 | $Z_1 = 32$ |
| Number of teeth of the second sun gear 18 | $Z_3 = 28$ |
| Number of teeth of the third sun gear 19 | $Z_5 = 32$ |

The third sun gear 19 can be connected to a casing 20 via a left hydraulic clutch $C_L$, and the rotational rate of a carrier member 11 is increased by engagement of the left hydraulic clutch $C_L$. The carrier member 11 can be connected to the casing 20 via a right hydraulic clutch $C_R$, and the rotational rate of the carrier member 11 is reduced by engagement of the right hydraulic clutch $C_R$. The above-mentioned right hydraulic clutch $C_R$ and left hydraulic clutch $C_L$ are controlled by a first electronic control unit $U_1$ containing a microcomputer.

As shown in FIG. 2, signals from an engine torque detecting means $S_1$ for detecting the engine torque $T_E$, an engine rotational rate detecting means $S_2$ for detecting the rotational rate Ne of the engine E, a vehicle speed detecting means $S_3$ for detecting the vehicle speed V and a steering angle detecting means $S_4$ for detecting the steering angle θ are input into the first electronic control unit $U_1$. The first electronic control unit $U_1$ processes the signals from the above-mentioned detecting means $S_1$ to $S_4$ based on a predetermined program, thus controlling the above-mentioned left hydraulic clutch $C_L$ and right hydraulic clutch $C_R$.

The first electronic control unit $U_1$ comprises a drive shaft torque calculating means M1, a gear ratio calculating means M2, a first right and left distribution correction factor calculating means M3, a target yaw rate calculating means M4, a lateral acceleration calculating means M5, a second right and left distribution correction factor calculating means M6, a front right and left wheel torque calculating means M7, a current correction amount calculating means M8 and an offset current calculating means M13.

The drive shaft torque calculating means M1 calculates the drive shaft torque $T_D$ (that is to say, the total torque transmitted to the front right and left wheels $W_{FR}$, $W_{FL}$) by multiplying the engine torque $T_E$ by the gear ratio Ni produced by the gear ratio calculating means M2 from the rotational rate Ne of the engine and the vehicle speed V. The engine torque $T_E$ can be obtained from the intake pressure (or opening of the accelerator) and the rotational rate Ne of the engine, and the drive shaft torque $T_D$ can also be obtained by a means other than that mentioned above such as a torque detecting means provided on the power transmission system or the longitudinal acceleration of the vehicle. Furthermore, the vehicle speed V may be determined by a means other than the wheel speed such as an optical means using a spatial filter, or it may be determined using a Doppler radar.

The first right and left distribution correction factor calculating means M3 carries out a map look-up for a first right and left distribution correction factor $K_T$ based on the drive shaft torque $T_D$ and a second right and left distribution correction factor $K_V$ based on the vehicle speed V. The target yaw rate calculating means M4 carries out map look-up for the steering angle component $Y_1$ of the target yaw rate Y based on the steering angle θ and the vehicle speed component $Y_2$ of the target yaw rate Y based on the vehicle speed V, and calculates the target yaw rate Y by multiplying the steering angle component $Y_1$ by the vehicle speed component $Y_2$. The lateral acceleration calculating means M5 calculates the lateral acceleration $Y_G$ by multiplying the aforementioned target yaw rate Y by the vehicle speed V, and the second right and left distribution correction factor calculating means M6 carries out a map look-up for the right and left distribution correction factor G based on the above-mentioned lateral acceleration $Y_G$.

Finally, the front right and left wheel torque calculating means M7 calculates a distributed torque $T_L$ that is to be distributed to the front left wheel $W_{FL}$ and a distributed torque $T_R$ that is to be distributed to the front right wheel $W_{FR}$ based on the equations below.

$$T_L = (T_D/2) \times (1 + K_W \times K_T \times K_V \times G) \quad (1)$$

$$T_R = (T_D/2) \times (1 - K_W \times K_T \times K_V \times G) \quad (2)$$

Here, $K_V$ and $K_T$ denote the right and left distribution correction factors obtained by the first right and left distribution correction factor calculating means M3, G denotes the right and left distribution correction factor obtained by the second right and left distribution correction factor calculating means M6, and $K_W$ is a constant.

The term $(1 \pm K_W \times K_T \times K_V \times G)$ on the right hand side of equation (1) and equation (2) determines the torque distribution ratio between the front right and left wheels $W_{FR}$, $W_{FL}$, and when the torque distribution to one of the front right and left wheels $W_{FR}$, $W_{FL}$ increases by a predetermined amount, the torque distribution to the other of the front right and left wheels $W_{FR}$, $W_{FL}$ decreases by the above-mentioned predetermined amount.

When the distributed torques $T_R$, $T_L$ that are to be distributed to the front right and left wheels $W_{FR}$, $W_{FL}$ are determined as above-mentioned, the right hydraulic clutch $C_R$ and left hydraulic clutch $C_L$ are controlled so that the above-mentioned distributed torques $T_R$, $T_L$ are transmitted to the front right and left wheels $W_{FR}$, $W_{FL}$.

The distributed torques $T_R$, $T_L$ that are to be distributed to the right and left front wheels $W_{FR}$, $W_{FL}$ and which are calculated by the front right and left wheel torque calculating means M7 are input into the current correction amount calculating means M8. The current correction amount calculating means M8 inputs the distributed torques $T_R$, $T_L$ to the map shown in FIG. 7 and looks up the amount of current correction $\Delta I$ for the motor 27 of the electric power steering device S described below. The amount of current correction $\Delta I$ corresponds to current level necessary for the electric power steering device S to generate a steering torque that can counteract the torque-steer phenomenon caused by the distributed torques $T_R$, $T_L$ generated by the driving force distribution device T.

As is clear from FIG. 7, the amount of current correction $\Delta I$ increases linearly from 0 A to 22 A while the distributed torques $T_R$, $T_L$ increase from 20 kgfm to 70 kgfm, and when the distributed torques $T_R$, $T_L$ exceed 70 kgfm the amount of current correction $\Delta I$ is maintained at an upper limit value of 22 A. Although the maximum value for the current that is supplied to the motor 27 of the electric power steering device S for steering assist is 85 A, the upper limit value of 22 A for the amount of current correction $\Delta I$ is set so as to be smaller than the above-mentioned maximum value for the current.

The offset current calculating means M13 calculates an offset current $\Delta I_{OS}$ by reducing the amount of current correction $\Delta I$ calculated by the current correction amount calculating means M8 by a predetermined proportion. As is clear from FIG. 7, in the present embodiment the offset current $\Delta I_{OS}$ is set so as to be 0.7 times the amount of the current correction $\Delta I$. In addition, since the electric power steering device S has the characteristic that the higher the vehicle speed, the smaller the assist current, when the vehicle speed is less than 70 km/h the offset current $\Delta I_{OS}$ is set so as to be 0.7 times the amount of the current correction $\Delta I$, and when the vehicle speed is 70 km/h or higher the offset current $\Delta I_{OS}$ may be set so as to be 0.8 times the amount of the current correction $\Delta I$.

In accordance with a command from the first electronic control unit $U_1$, both the right hydraulic clutch $C_R$ and the left hydraulic clutch $C_L$ are in a disengaged state while the vehicle is travelling straight ahead. Thus, the carrier member 11 and the third sun gear 19 are not restrained, and the left drive shaft $9_L$, the right drive shaft $9_R$, the planetary carrier 8 of the differential D and the carrier member 11 all rotate in unison. At this time, the torque of the engine E is transmitted equally from the differential D to the front right and left wheels $W_{FR}$, $W_{FL}$ as shown by the hatched arrows in FIG. 1.

When the vehicle is turning right at a medium to low speed, as shown in FIG. 3 the right hydraulic clutch $C_R$ is engaged in accordance with a command from the first electronic control unit $U_1$ so as to stop the carrier member 11 by connecting it to the casing 20. At this time, since the left output shaft $9_L$ which is integrated with the front left wheel $W_{FL}$ and the right output shaft $9_R$ which is integrated with the front right wheel $W_{FR}$ (that is to say, the planetary carrier 8 of the differential D) are linked via the second sun gear 18, the second pinion 14, the first pinion 13 and the first sun gear 17, the rotational rate $N_L$ of the front left wheel $W_{FL}$ is increased relative to the rotational rate $N_R$ of the front right wheel $W_{FR}$ according to the relationship shown in the equation below.

$$N_L/N_R = (Z_4/Z_3) \times (Z_2/Z_2) = 1.143 \quad (3)$$

When the rotational rate $N_L$ of the front left wheel $W_{FL}$ is increased relative to the rotational rate $N_R$ of the front right wheel $W_{FR}$ as above-mentioned, a proportion of the torque of the front right wheel $W_{FR}$ which is the inner turning wheel can be transmitted to the front left wheel $W_{FL}$ which is the outer turning wheel as shown by the hatched arrow in FIG. 3.

Instead of stopping the carrier member 11 by means of the right hydraulic clutch $C_R$, if the rotational rate of the carrier member 11 is reduced by appropriately adjusting the engagement force of the right hydraulic clutch $C_R$, the rotational rate $N_L$ of the front left wheel $W_{FL}$ can be increased relative to the rotational rate $N_R$ of the front right wheel $W_{FR}$ according to the deceleration, and the required level of torque can be transferred from the front right wheel $W_{FR}$ which is the inner turning wheel to the front left wheel $W_{FL}$ which is the outer turning wheel.

On the other hand, when the vehicle is turning left at a medium to low speed, as shown in FIG. 4, the left hydraulic clutch $C_L$ is engaged in accordance with a command from the first electronic control unit $U_1$ and the third pinion 15 is connected to the casing 20 via the third sun gear 19. As a result, the rotational rate of the carrier member 11 increases relative to the rotational rate of the left output shaft $9_L$, and the rotational rate $N_R$ of the front right wheel $W_{FR}$ is increased relative to the rotational rate $N_L$ of the front left wheel $W_{FL}$ in accordance with the relationship shown in the equation below.

$$N_R/N_L = \{1-(Z_4/Z_6) \times (Z_2/Z_1)\} + \{1-(Z_4/Z_6) \times (Z_4/Z_3)\} = 1.167 \quad (4)$$

As mentioned above, when the rotational rate $N_R$ of the front right wheel $W_{FR}$ increases relative to the rotational rate $N_L$ of the front left wheel $W_{FL}$, a proportion of the torque of the front left wheel $W_{FL}$, which is the inner turning wheel, can be transmitted to the front right wheel $W_{FR}$, which is the outer turning wheel, as shown by the hatched arrow in FIG. 4. In this case also, if the rotational rate of the carrier member 11 is increased by appropriately adjusting the engagement force of the left hydraulic clutch $C_L$, according to the acceleration, the rotational rate $N_R$ of the front right wheel $W_{FR}$ can be increased relative to the rotational rate $N_L$ of the front left wheel $W_{FL}$, and the required level of torque can be transferred from the front left wheel $W_{FL}$, which is the inner turning wheel, to the front right wheel $W_{FR}$, which is the outer turning wheel. It is thus possible to enhance the turning performance by transmitting a larger torque to the outer turning wheel than to the inner turning wheel at times when the vehicle is travelling at a medium to low speed. In addition, when the vehicle is travelling at a high speed it is possible to enhance the stability of travel by lessening the torque transmitted to the outer turning wheel in comparison with the above-mentioned case of a medium to low speed or alternatively by transferring torque from the outer turning wheel to the inner turning wheel. This can be achieved in the first right and left distribution correction factor calculating means M3 of the first electronic control unit $U_1$ by setting the map of the second right and left distribution correction factor $K_V$ relative to vehicle speed V.

As is clear from a comparison of equation (3) with equation (4), since the numbers of teeth of the first pinion 13, the second pinion 14, the third pinion 15, the first sun gear 17, the second sun gear 18 and the third sun gear 19 are set as above-mentioned, the ratio (about 1.143) of the rotational speed of the front left wheel $W_{FL}$ to the rotational speed of the front right wheel $W_{FR}$ and the ratio (about 1.167) of the rotational speed of the front right wheel $W_{FR}$ to the rotational speed of the front left wheel $W_{FL}$ can be substantially equalized to each other.

When changes are made in the driving forces which are distributed from the engine E to the front right and left wheels $W_{FR}$, $W_{FL}$ via the driving force distribution device T, undesirable steering forces are produced in the front right and left wheels $W_{FR}$, $W_{FL}$, which are steered wheels, due to the so-called torque steer phenomenon. In a vehicle containing an electric power steering device S, if the torque steer phenomenon is caused due to the operation of the driving force distribution device T, then by operating the electric power steering device S so as to cancel the steering force due to the torque steer phenomenon and generate a steering assist torque in the opposite direction, the above-mentioned torque steer phenomenon can be lessened.

Next, an explanation of a vehicle steering system is given based on FIG. 5.

A steering torque which is input into a steering wheel 21 by a driver is transmitted to a rack 25 via a steering shaft 22, a connecting shaft 23 and a pinion 24, and the reciprocating motion of the rack 25 is further transmitted to the front right and left wheels $W_{FR}$, $W_{FL}$ via right and left tie rods 26, 26 so as to steer the front wheels $W_{FR}$, $W_{FL}$. An electric power steering device S provided in the vehicle's steering system comprises a drive gear 28 provided on an output shaft of a motor 27, a driven gear 29 meshing with the drive gear 28, a screw shaft 30 which is integral with the driven gear 29, and a nut 31 which meshes with the screw shaft 30 and is also connected to the above-mentioned rack 25.

A second electronic control unit $U_2$ does not control the operation of the electric power steering device S by itself, but it co-operatively controls the operation of the electric power steering device S in conjunction with the operation of the driving force distribution device T.

As shown in FIG. 6, the second electronic control unit $U_2$ comprises a target current setting means M9, a drive control means M10, a drive inhibition means M11, a drive inhibition determining means M12, an upper limit checking means M14, a current correction amount reducing means M15, a calculation checking means M16 and a subtraction means 33.

The upper limit checking means M14 checks that the amount of current correction $\Delta I$ and the offset current $\Delta I_{OS}$ input from the first electronic control unit $U_1$ are definitely not higher than 22 A, and the calculation checking means M16 checks that the offset current $\Delta I_{OS}$ is definitely 0.7 times the amount of the current correction $\Delta I$. When an abnormality is observed in the above-mentioned checking, it is determined that there is a malfunction and, for example, operation of the driving force distribution device T is suspended.

The current correction amount reducing means M15 reduces the amount of current correction $\Delta I$ input from the upper limit checking means M14 based on the vehicle speed V detected by the vehicle speed detecting means $S_3$. As is clear from FIG. 8, the limit value for the amount of current correction $\Delta I$ is set so as to be 22 A toward zero in the low and medium vehicle speed region wherein the vehicle speed V is from 0 km/h to 80 km/h, and it is set so as to linearly decrease from 22 A in the high vehicle speed region wherein the vehicle speed V is 80 km/h or higher. In the case where the amount of current correction $\Delta I$ which has been input from the upper limit checking means M14 into the current correction amount reducing means M15 exceeds the limit in FIG. 8, the amount of current correction $\Delta I$ is restricted by the limit value and decreases. That is to say, the amount of current correction $\Delta I$ decreases according to an increase in the vehicle speed V.

The target current setting means M9 carries out a map look up for the target current $I_{MS}$ for driving the motor 27 of the electric power steering device S based on the vehicle speed V which is input from the vehicle speed detecting means $S_3$ and the steering torque $T_Q$ which is input from the steering torque detecting means $S_5$. The target current $I_{MS}$ is set so as to increase in response to an increase in the steering torque $T_Q$ and increase in response to a decrease in the vehicle speed V, and these characteristics allow a steering assist torque to be generated according to the travel state of the vehicle.

The target current $I_{MS}$ which is output from the target current setting means M9 and the amount of current correction $\Delta I'$ which is output from the current correction amount reducing means M15 are input into the subtraction means 33, in which the amount of current correction $\Delta I'$ is subtracted from the target current $I_{MS}$ so as to give a corrected target current $I_{MS}'$ ($=I_{MS}-\Delta I'$). In the case where a steering force is applied due to operation of the driving force distribution device T in the same direction as that of the steering operation by the driver, the corrected target current $I_{MS}'$ is calculated by subtracting the amount of current correction $\Delta I'$ from the target current $I_{MS}$, but in the case where a steering force is applied in the direction opposite to that of the steering operation by the driver, the corrected target current $I_{MS}'$ may be calculated by adding the amount of current correction $\Delta I'$ to the target current $I_{MS}$.

The drive control means M10 converts the corrected target current $I_{MS}'$ into a motor drive signal $V_D$ and outputs the motor drive signal $V_D$ to the drive inhibition means M11. When no drive inhibition signal is input from the drive inhibition determining means M12, the drive inhibition means M11 outputs the above-mentioned motor drive signal $V_D$ to the motor driver 32 so as to drive the motor 27 at a motor voltage $V_M$ and thus a steering assist torque is generated in the electric power steering device. By controlling the electric power steering device S based on the corrected target current $I_{MS}'$ calculated from the target current $I_{MS}$ and the amount of current correction $\Delta I'$ it becomes possible to simultaneously lessen the torque steer phenomenon and assist the steering operation by the driver, which is the primary function of the electric power steering device S.

Since the amount of current correction $\Delta I'$ which is input from the current correction amount reducing means M15 into the subtraction means 33 decreases in response to an increase in the vehicle speed V (see FIG. 8), in the case where an erroneous amount of current correction $\Delta I$ is output due to a malfunction of the first electronic control unit $U_1$ of the driving force distribution device T at a high vehicle speed, at which the effect of steering is large, the generation of a steering torque by the electric power steering device S at such a level that the driver experiences a disagreeable sensation can be prevented. For example, when the vehicle is travelling straight ahead and the driving force distribution device T is in a non-operational state, since the distributed torques $T_R$, $T_L$ are equal the amount of current correction $\Delta I$ should be 0. If an amount of current correction $\Delta I$ is output due to a malfunction of the first electronic control unit $U_1$ in such circumstances, although the electric power steering device S generates an unnecessary steering torque, since the current correction amount reducing means M15 outputs an amount of current correction $\Delta I'$ to the subtraction means 33, which is obtained by reducing the amount of current correction $\Delta I$ in response to an increase in the vehicle speed V, the unnecessary steering torque generated by the electric power steering device S at a high vehicle speed can be reduced and the disagreeable sensation experienced by the driver can be lessened.

On the other hand, in the case where an abnormality such as a malfunction of the control system occurs, a drive inhibition signal is input from the drive inhibition determining means M12 into the drive inhibition means M11, the drive inhibition means M11 inhibits the output of the above-mentioned motor drive signal $V_D$ and the operation of the electric power steering device S, and thus the electric power steering device S is prevented from generating a steering assist torque which is not anticipated by the driver. The drive inhibition determining means M12, together with the torque detecting means $S_5$ the upper limit checking means M14, and the calculation checking means M16, function as means for determining a malfunction of the electric power steering device or the second control means U2.

An actual motor current $I_M$ which is detected by a current detecting means $S_6$ and supplied to the motor 27, a steering torque $T_Q$ detected by a steering torque detecting means $S_5$ and an offset current $\Delta I_{OS}$ which is output from the calculation checking means M16, are input into the drive inhibition determining means M12. The drive inhibition determining means M12 determines whether or not the drive of the electric power steering device S is inhibited by inputting the actual motor current $I_M$ and the steering torque $T_Q$ to a map which has been corrected based on the offset current $\Delta I_{OS}$.

FIG. 9A is a map of the art for carrying out the above-mentioned inhibition determination, and this map was originally prepared for a vehicle not containing a driving force distribution device T, that is to say, a vehicle in which co-operative control of an electric power steering device S and a driving force distribution device T was not carried out. In the figure the abscissa denotes the steering torque $T_Q$ detected by the steering torque detecting means $S_5$ and the ordinate denotes the actual motor current $I_M$ detected by the current detecting means $S_6$. The region on the right-hand side of the origin on the abscissa in which the steering torque $T_Q$ is positive (+) corresponds to a case in which a steering torque in the direction for turning right is input into the steering wheel 21, and the region on the left-hand side of the origin on the abscissa in which the steering torque $T_Q$ is negative (−) corresponds to a case in which a steering torque in the direction for turning left is input into the steering wheel 21. The region above the origin on the ordinate in which the actual motor current $I_M$ is positive (+) corresponds to a case in which the motor 27 outputs a torque in the direction for turning right, and the region below the origin on the ordinate in which the actual motor current $I_M$ is negative (−) corresponds to a case in which the motor 27 outputs a steering torque in the direction for turning left. When the steering torque $T_Q$ and the actual motor current $I_M$ are in the hatched assist inhibition regions, the drive inhibition determining means M12 outputs a command to inhibit the drive of the motor 27 to the drive inhibition means M11.

For example, when the motor 27 is driven in the direction for turning right by a large current due to a malfunction of the second electronic control unit $U_2$ despite the driver not carrying out a steering operation, the actual motor current $I_M$ at that time is in position 'a' in the (+) region. Since the motor 27 is driven in the direction for turning right against the driver's will, the driver attempts to drive the vehicle in a straight line by applying a strong steering torque $T_Q$ in the direction for turning left to the steering wheel 21 and, therefore, the steering torque $T_Q$ detected by the steering torque detecting means $S_5$ corresponds to position 'b' in the (−) region. As a result, the actual motor current $I_M$ and the steering torque $T_Q$ have a relationship denoted by the point P in FIG. 9A and enter the hatched assist inhibition region, the drive inhibition determining means M12 outputs a command to inhibit the drive of the motor 27 and thus it is possible to prevent the electric power steering device S from generating an undesirable steering assist torque.

The above-mentioned explanation applies to a vehicle in which co-operative control of the electric power steering device S and the driving force distribution device T is not carried out, but vehicles which carry out co-operative control have the following disadvantages. That is to say, since the actual motor current $I_M$ in a vehicle which carries out co-operative control includes a current component for assisting the steering operation of the driver and a current component for lessening the torque steer phenomenon, if the map in FIG. 9A, in which the current component for lessening the torque steer phenomenon is not considered, is used as it is, there is a possibility that an erroneous determination might be made and the operation of the electric power steering device S might be inhibited when its operation is necessary or the operation of the electric power steering device S might be permitted when its operation is unnecessary.

For example, in a vehicle which carries out co-operative control, there are cases in which steering assist is permitted even in regions in which the direction of the steering torque $T_Q$ is opposite to the direction of the actual motor current $I_M$ (the second and fourth quadrants in FIG. 9A). This is because a torque steer phenomenon in the same direction as the steering direction is caused by the operation of the driving force distribution device T. Considering a case in which the amount of current correction $\Delta I$ in the opposite direction to the torque steer phenomenon that is required in order to counteract it is larger than the target current $I_{MS}$ of the electric power steering device S, if the map in FIG. 9A is used as it is, since the steering assist is inhibited, it is impossible to counteract the torque steer phenomenon.

In order to avoid the above-mentioned situation, as shown in FIG. 9B, the assist inhibition area may be shifted upwards in the ordinate direction by an amount corresponding to the amount of current correction $\Delta I$. By so doing it is possible to cause an amount of steering torque, in the direction opposite to the steering direction, corresponding to the amount of current correction $\Delta I$ in the electric power steering device S and thus cancel the torque steer phenomenon accompanying the operation of the driving force distribution device T.

However, when the map which is used for determining the drive inhibition of the electric power steering device S is shifted upwards in the ordinate direction by an amount corresponding to the amount of current correction $\Delta I$ as shown in FIG. 9B above-mentioned, the following disadvantages may occur. For example, taking a case where, since the vehicle is travelling straight ahead, the distributed torques $T_L$, $T_R$ generated by the driving force distribution device T are equal, and since the driver is not operating the steering system current $I_{MS}$ is zero, an amount of current correction $\Delta I$ which should theoretically be zero is output due to a malfunction of the first electronic control unit $U_1$. The amount of this abnormal current correction $\Delta I$ exceeding 22 A is cut by the upper limit checking means M14, but the electric power steering device S is operated by an amount of current correction $\Delta I$ of 22 A, which is the maximum value allowed through the upper limit checking means M14, and there is a possibility that a disagreeable sensation may be experienced by the driver. In particular, when the vehicle is travelling at high speed, since the change in vehicle behaviour caused by a steering operation is large, the disagreeable sensation experienced by the driver becomes large.

In order to solve this disadvantage, in the present embodiment the offset current calculation means M13 provided in the first electronic control unit $U_1$ of the driving force distribution device T calculates an offset current $\Delta I_{OS}$ by reducing the amount of current correction $\Delta I$ (see FIG. 7), and the assist inhibition areas are shifted in the ordinate direction by an amount corresponding to the aforementioned offset current $\Delta I_{OS}$. As a result, the map that is used for determining the inhibition of the drive of the electric power steering device S is that shown in FIG. 9C.

FIG. 9C should be compared with FIG. 9B. In FIG. 9B, in which the assist inhibition areas are shifted in the ordinate direction by an amount corresponding to the amount of current correction $\Delta I$, when a steering assist force exceeding the amount of current correction $\Delta I$ (maximum 22 A) is generated in the opposite direction, it is determined that the drive of the electric power steering device S is inhibited, whereas when a steering assist force which is only slightly smaller than the aforementioned 22 A is generated in the opposite direction, the drive of the electric power steering device S might be permitted in some cases. On the other hand, in FIG. 9C an offset current $\Delta I_{OS}$ which is obtained by reducing the amount of current correction $\Delta I$ to 70% is employed, the amount by which the assist inhibition areas are shifted in the ordinate direction is 70% of that in FIG. 9B, and when a steering assist force exceeding the maximum value of 22 A×0.7=15.4 A is generated in the opposite direction, it is determined that the drive of the electric power steering device S is inhibited.

As hereinbefore described, by setting the offset current $\Delta I_{OS}$ so as to be smaller than the amount of current correction $\Delta I$, the operation of the electric power steering device S can be inhibited at a point where the actual motor current $I_M$ exceeds the offset current $\Delta I_{OS}$, and whereby alleviating a disagreeable sensation experienced by the driver. Thus, if the first electronic control unit $U_1$ of the driving force distribution device T malfunctions while co-operative control between the driving force distribution device T and the electric power steering device S is enabled, it is possible to prevent the electric power steering device S from generating a large degree of steering assist force so giving a disagreeable sensation to the driver.

Next, a second embodiment of the present invention is explained by reference to FIG. 10, which is a schematic block diagram of the circuit of the second electronic control unit, similar to that of the first embodiment shown in FIG. 6.

In the aforementioned first embodiment, the actual motor current $I_M$ is used for determining whether or not the drive of the motor 27 of the electric power steering device S is inhibited, but in the present embodiment while considering the proportional relationship between the motor drive signal $V_D$ output from the drive control means M10 and the aforementioned actual motor current $I_M$, the motor drive signal $V_D$ is used instead of the actual motor current $I_M$ to give the same effects as those obtained in the first embodiment.

More specifically, the first electronic control unit $U_1$ of the driving force distribution device T calculates the correction current $\Delta I$ and the offset signal $\Delta V_{OS}$ corresponding to the correction current $\Delta I$ and the upper limit checking means M14 and the calculation checking means M16 of the second electronic control unit $U_2$ of the electric power steering device S check whether or not the offset signal $\Delta V_{OS}$ is below a predetermined upper limit value. Moreover, the drive inhibition determining means M12 into which the motor drive signal $V_D$ output from the drive control means M10, the driving torque $T_Q$ output from the driving torque detecting means $S_5$ and the aforementioned offset signal $\Delta V_{OS}$ are input determines whether or not the motor drive signal $V_D$ and the driving torque $T_Q$ are in the assist inhibition area. The map used in this case is substantially the same as the map (ref. FIG. 9C) used in the first embodiment and corresponds to that in which the ordinate is changed from 'the actual motor current $I_M$ to 'the motor drive signal $V_D$ and the degree of shift in the ordinate direction is changed from 'the offset $\Delta I_{OS}$ to 'the offset signal $\Delta V_{OS}$.

Thus, in the second embodiment also, when cooperative control between the driving force distribution device T and the electric power steering device S is enabled, if the first electronic control unit $U_1$ of the driving force distribution device T malfunctions and an abnormal correction current $\Delta I$ is output, operation of the electric power steering device S is effectively inhibited so lessening the disagreeable sensation experienced by the driver.

In order to effectively lessen the torque steer phenomenon which accompanies the operation of the driving force distribution device, it is necessary to output a correction signal for correcting the motor control signal from the control means of the driving force distribution device to the control means of the electric power steering device without any delay. However, since the extent to which the communication cycle between the aforementioned two control means can be reduced is limited, the generation of a steering assist torque by the correction signal is delayed with the consequence that the torque steer phenomenon cannot be completely suppressed, and there is a possibility that the driver might experience a disagreeable sensation. In order to prevent this, setting the correction signal so as to be larger than the value required to counteract the torque steer phenomenon has been considered. However, when the torque steer phenomenon is small because of a small degree of driving force distribution by the driving force distribution device, if a large correction signal is output due to an erroneous estimation of the degree of driving force distribution, an unexpected steering assist torque is caused and there is a possibility that the driver might experience a disagreeable sensation.

Therefore, with regard to a co-operative control system for a vehicle for lessening the torque steer phenomenon by co-operatively controlling a force distribution device and an electric power steering device, it is necessary to prevent a large steering assist torque from being generated in a region in which the degree of force distribution is small, because such a large steering assist torque would give the driver a disagreeable sensation. A co-operative control system for a vehicle comprising a configuration which meets the above-mentioned requirement is explained below by reference to FIG. 11 to FIG. 13.

As is clear from comparison of FIG. 11 with FIG. 2 (the first embodiment), a first electronic control unit $U_1$ shown in FIG. 11 is different from the first electronic control unit $U_1$ of the first embodiment in that it comprises no offset current calculating means M13. The current correction amount calculating means M8" shown in FIG. 11 looks up the amount of current correction $\Delta I$ for the motor 27 of the electric power steering device S as described below.

The broken line in FIG. 13 refers to the amount of torque steer, and this amount of torque steer is proportional to the torque distributions $T_R$, $T_L$. The amount of current correction $\Delta I$ shown by the solid line is not proportional to the torque distributions $T_R$, $T_L$, and the region in which the torque distributions $T_R$, $T_L$ are from 0 to $T_1$ is considered to be a non-responsive region and the amount of current correction $\Delta I$ is maintained at zero even when the torque distributions $T_R$, $T_L$ increase. The region in which the torque distributions $T_R$, $T_L$ are from $T_1$ to $T_3$ is a region in which the amount of current correction $\Delta I$ increases, the slope thereof is set so as to be larger than the slope for the amount of torque steer, and therefore the amount of current correction $\Delta I$ exceeds the amount of torque steer in the region in which the torque distributions $T_R$, $T_L$ are larger than $T_2$. The amount of torque steer at the point at which the torque distributions $T_R$, $T_L$ are $T_4$ is defined as the maximum value $\Delta I_{MAX}$ (e.g., 22 A) for the amount of current correction $\Delta I$, and in the region where the torque distributions $T_R$, $T_L$ are from $T_3$ to $T_4$ the amount of current correction $\Delta I$ is maintained at the aforementioned maximum value $\Delta I_{MAX}$.

As is clear from a comparison of FIG. 12 with FIG. 6 (the first embodiment), the second electronic control unit $U_2$ shown in FIG. 12 comprises a target current setting means M9, a drive control means M10, a drive inhibition means M11, a drive inhibition determining means M12, an upper limit checking means M14 and a subtraction means 33, but it does not include the current correction amount reducing means M15 or the calculation checking means M16 of the first embodiment.

The upper limit checking means M14 checks that the amount of current correction $\Delta I$ input from the first electronic control unit $U_1$ is definitely not higher than 22 A.

The target current setting means M9 carries out a map look up for the target current $I_{MS}$ for driving the motor 27 of the electric power steering device S based on the vehicle speed V which is input from the vehicle speed detecting means $S_3$ and the steering torque $T_Q$ which is input from the steering torque detecting means $S_5$. The target current $I_{MS}$ is set so as to increase in response to an increase in the steering torque $T_Q$ and increase in response to a decrease in the vehicle speed V, and these characteristics allow a steering assist torque to be generated according to the travel state of the vehicle.

The target current $I_{MS}$ which is output from the target current setting means M9 and the amount of current correction $\Delta I$ which is output from the upper limit checking means M14 are input into the subtraction means 33, in which the amount of current correction $\Delta I$ is subtracted from the target current $I_{MS}$ so as to give a corrected target current $I_{MS}'$ ($=I_{MS}-\Delta I$). In the case where a steering force is applied due to the operation of the driving force distribution device T in the same direction as that of the steering operation of the driver, the corrected target current $I_{MS}'$ is calculated by subtracting the amount of current correction $\Delta I$ from the target current $I_{MS}$, but in the case where a steering force is applied in the opposite direction to that of the steering operation of the driver, the corrected target current $I_{MS}'$ may be calculated by adding the amount of current correction $\Delta I$ to the target current $I_{MS}$.

The drive control means M10 converts the corrected target current $I_{MS}'$ into a motor drive signal $V_D$ and outputs the motor drive signal $V_D$ to the drive inhibition means M11. When no drive inhibition signal is input from the drive inhibition determining means M12, the drive inhibition means M11 outputs the above-mentioned motor drive signal $V_D$ to the motor driver 32 so as to drive the motor 27 at a motor voltage $V_M$ and thus the electric power steering device S is made to generate a steering assist torque. By controlling the electric power steering device S based on the corrected target current $I_{MS}'$ calculated from the target current $I_{MS}$ and the amount of current correction $\Delta I$ it becomes possible to simultaneously lessen the torque steer phenomenon and assist the steering operation by the driver, which is the primary function of the electric power steering device S.

In the case where an abnormality such as a malfunction of the control system occurs, a drive inhibition signal is input from the drive inhibition determining means M12 into the drive inhibition means M11, the drive inhibition means M11 inhibits the output of the above-mentioned motor drive signal $V_D$ and the operation of the electric power steering device S, and thus the electric power steering device S is prevented from generating a steering assist torque which is not anticipated by the driver.

An actual motor current $I_M$ which is detected by a current detecting means $S_6$ and supplied to the motor 27, a steering torque $T_Q$ detected by a steering torque detecting means $S_5$ and an offset current $\Delta I_{OS}$ which is output from the upper limit checking means M14 are input into the drive inhibition determining means M12. In the present embodiment, the offset current $\Delta I_{OS}$ is the same as the amount of current correction $\Delta I$ ($\Delta I = \Delta I_{OS}$). The drive inhibition determining means M12 determines whether or not the drive of the electric power steering device S is inhibited by inputting the actual motor current $I_M$ and the steering torque $T_Q$ to a map which has been corrected on the basis of the offset current $\Delta I_{OS}$.

FIG. 9A is, again, a map of the art for carrying out the above-mentioned determination, and this map was originally prepared for a vehicle not containing a driving force distribution device T, that is to say, a vehicle in which co-operative control of an electric power steering device S and a driving force distribution device T was not carried out. When the steering torque $T_Q$ and the actual motor current $I_M$ are in the hatched assists inhibition regions, the drive inhibition determining means M12 outputs a command to inhibit the drive of the motor 27 to the drive inhibition means M11.

Again, however, because the above-mentioned explanation applies to a vehicle without co-operative control of the electric power steering device S and the driving force distribution device T, if the map in FIG. 9A in which the current component for lessening the torque steer phenomenon is not considered is used as it is, there is a possibility that an erroneous determination might be made and the operation of the electric power steering device S might be inhibited when its operation is necessary or the operation of the electric power steering device S might be permitted when its operation is unnecessary.

In the present embodiment, and again in with reference to FIG. 9B, in order to avoid the above-mentioned situation, the assist inhibition area may be shifted upwards in the ordinate direction by an amount corresponding to the amount of current correction $\Delta I$ (that is to say, the offset current $\Delta I_{OS}$). By so doing it is possible to cause an amount of steering torque, in the direction opposite to that of the steering direction, corresponding to the amount of current correction $\Delta I$ in the electric power steering device S and thus cancel the torque steer phenomenon accompanying the operation of the driving force distribution device T.

As was explained for FIG. 13, since the region in which the torque distributions $T_R$, $T_L$ are from 0 to $T_1$ is a non-responsive region and the amount of current correction $\Delta I$ is maintained at zero, the electric power steering device S does not generate a steering assist torque for counteracting the torque steer phenomenon in this region. Therefore, in a case where the torque distributions $T_R$, $T_L$ are erroneously estimated in the region in which the torque distributions $T_R$, $T_L$ are small, the electric power steering device S is prevented from generating an inadequate steering assist torque due to an erroneous estimation which would give a disagreeable sensation to the driver.

As described above, when the region in which the torque distributions $T_R$, $T_L$ are small is set as a non-responsive region, although the rise of the amount of current correction $\Delta I$ is delayed, the amount of current correction $\Delta I$ is set so as to have a large slope in the subsequent region in which the torque distributions $T_R$, $T_L$ are from $T_1$ to $T_3$. Thus an amount of current correction $\Delta I$ which exceeds the amount of torque steer is output in the region in which the torque distributions $T_R$, $T_L$ are from $T_2$ to $T_4$, and this therefore compensates for the aforementioned delay in the rise of the amount of current correction $\Delta I$, whereby sufficient steering assist torque is generated and the torque steer phenomenon can effectively be lessened. Moreover, since the maximum value $\Delta I_{MAX}$ is maintained after the point at which the amount of current correction $\Delta I$ reaches the maximum value $\Delta I_{MAX}$, i.e., where the torque distributions $T_R$, $T_L$ are $T_3$, it is possible to prevent the electric power steering device S from generating an excess steering assist torque.

Embodiments of the present invention have been described in detail above, but the present invention can be modified in a variety of ways without departing from the spirit and scope of the invention, as set forth in the appended claims.

For example, the driving force distribution device in the present invention is not limited to one in which the driving force is distributed between the right and the left wheels, but may be one in which the driving force is distributed between the front and the rear wheels. Furthermore, the present invention can also be applied in cases where the braking force is distributed between the right and the left wheels or the front and the rear wheels, or in which both driving force and braking force are distributed between the right and left wheels or the front and rear wheels.

What is claimed is:

1. A co-operative control system for a vehicle having a force distribution device for distributing at least one of a driving force and a braking force between spaced apart wheels, the co-operative system comprising: a first control means for controlling operation of the force distribution device; an electric power steering device having a motor for applying a steering assist torque to a steering system of the vehicle; and a second control means for calculating a motor control signal for driving the motor based on at least a steering torque signal detected by a steering torque detecting means, and for inhibiting drive of the motor based on at least an actual motor current signal detected by a current detecting means and the steering torque signal, wherein:

the first control means calculates a correction signal for correcting said motor control signal based on the amount of control of the force distribution device and an offset current for correcting the actual motor current signal; and the second control means drives the motor based on a corrected motor control signal obtained by correcting the motor control signal with the correction signal and inhibits the drive of the motor based on a value obtained by correcting the actual motor current signal with the offset current and the steering torque signal, said offset current being set smaller than said correction signal.

2. A co-operative control system for a vehicle having a force distribution device for distributing at least one of a driving force and a braking force between spaced apart wheels, the co-operative control system comprising: a first control means for controlling operation of the force distribution device; an electric power steering device having a motor for applying a steering assist torque to a steering system of the vehicle; and a second control means for calculating a motor control signal for driving the motor based on at least a steering torque signal detected by a steering torque detecting means, and for inhibiting drive of the motor based on at least a motor drive signal calculated based on the motor control signal and the steering torque signal, wherein:

the first control means calculates a correction signal for correcting said motor control signal based on an amount of control of the force distribution device and an offset signal for correcting the motor drive signal; the second control means drives the motor based on a corrected motor control signal obtained by correcting the motor control signal with the correction signal, and inhibits the drive of the motor based on a value obtained by correcting the motor drive signal with the offset signal and the steering torque signal; and said offset signal being set smaller than a value obtained by converting said correction signal into an amount of motor drive.

* * * * *

UNITED STATES PATENT AND TRADEMARK OFFICE
CERTIFICATE OF CORRECTION

PATENT NO.    : 6,295,496 B1
DATED         : September 25, 2001
INVENTOR(S)   : T. Shinmura, H. Inagaki, M. Hori, T. Tomari, S. Okuma, A. Iwazaki,
                T. Kuribayashi and K. Wada It is certified that error appears in the above-identified patent and that said Letters Patent is hereby corrected as shown below:

<u>Column 6,</u>
Line 37, after "for" delete the period.

<u>Column 14,</u>
Line 6, after "$I_M$" insert -- ' --.
Line 7, after "$V_D$" insert -- ' --.
Line 8, after "$\Delta I_{OS}$" insert -- ' --; before the period insert -- ' --.

<u>Column 16,</u>
Line 45, change "in with" to -- with --.

Signed and Sealed this

Fourteenth Day of May, 2002

*Attest:*

*Attesting Officer*

JAMES E. ROGAN
*Director of the United States Patent and Trademark Office*